US012077453B2

(12) United States Patent
Vestergaard-Frandsen et al.

(10) Patent No.: US 12,077,453 B2
(45) Date of Patent: Sep. 3, 2024

(54) WATER FILTRATION DEVICE WITH SEQUENTIAL BACKWASH AND METHOD OF ITS OPERATION

(71) Applicant: LIFESTRAW SÀRL, Lausanne (CH)

(72) Inventors: Mikkel Vestergaard-Frandsen, Tiburon, CA (US); Alison Hill, Reisterstown, MD (US); Le Thu Cao, Hanoi (VN); Jean-Marc Pascal, Saint-Etienne de Crossey (FR); Jean-Luc Madier, Divonne les Bains (FR); Chung Quang Nguyen, Hanoi (VN); Toan Huu Vu, Hanoi (VN); Mathieu Corbineau, Bern (CH)

(73) Assignee: LIFESTRAW SÀRL, Lausanne (CH)

( * ) Notice: Subject to any disclaimer, the term of this patent is extended or adjusted under 35 U.S.C. 154(b) by 0 days.

(21) Appl. No.: 17/788,227

(22) PCT Filed: Dec. 22, 2020

(86) PCT No.: PCT/EP2020/087712
§ 371 (c)(1),
(2) Date: Jun. 22, 2022

(87) PCT Pub. No.: WO2021/130278
PCT Pub. Date: Jul. 1, 2021

(65) Prior Publication Data
US 2023/0136516 A1 May 4, 2023

Related U.S. Application Data

(60) Provisional application No. 62/952,997, filed on Dec. 23, 2019.

(51) Int. Cl.
*B01D 29/66* (2006.01)
*C02F 1/00* (2023.01)
(Continued)

(52) U.S. Cl.
CPC .............. *C02F 1/004* (2013.01); *C02F 1/444* (2013.01); *C02F 2303/16* (2013.01)

(58) Field of Classification Search
CPC .. B01D 29/0079; B01D 29/66; B01D 29/668; B01D 35/157; C02F 1/004; C02F 1/006;
(Continued)

(56) References Cited

U.S. PATENT DOCUMENTS 3,894,719 A * 7/1975 Horvath .................... C02F 1/42
251/231
4,282,902 A * 8/1981 Haynes .................. F16K 7/065
251/297
(Continued)

FOREIGN PATENT DOCUMENTS

AU 2016240897 B2 10/2020
CA 2418202 A1 8/2003
(Continued)

*Primary Examiner* — Patrick Orme
(74) *Attorney, Agent, or Firm* — Muncy, Geissler, Olds & Lowe, P.C.

(57) ABSTRACT

Disclosed is a water filtration device which includes various hoses for connection between different parts of the filtration device and a rotatable cam system which, during backwash cycles, is rotated so as to clamp various the hoses in predetermined sequences for thereby controlling the direction of the flow of water through the tubing system. Electrical pinch valves are use alternatively to a cam shaft.

20 Claims, 19 Drawing Sheets

(51) Int. Cl.
*C02F 1/44* (2023.01)
*F16K 7/06* (2006.01)

(58) Field of Classification Search
CPC .... C02F 1/283; C02F 1/444; C02F 2201/004; C02F 2201/007; C02F 2303/16; F16K 7/04; F16K 7/065
See application file for complete search history.

(56) References Cited

U.S. PATENT DOCUMENTS

| | | | |
|---|---|---|---|
| 4,504,390 | A | 3/1985 | Steffen |
| 4,534,869 | A | 8/1985 | Seibert |
| 4,773,991 | A | 9/1988 | Aid |
| 4,874,363 | A | 10/1989 | Abell |
| 5,326,033 | A | 7/1994 | Anfindsen |
| 5,653,255 | A | 8/1997 | Platz |
| 5,948,220 | A | 9/1999 | Kamitani et al. |
| 6,413,423 | B1 | 7/2002 | Falkner |
| 9,056,267 | B2 | 6/2015 | Sasaki et al. |
| 2007/0278158 | A1 | 12/2007 | Lakshman |
| 2014/0209525 | A1 | 7/2014 | Ikemizu |
| 2015/0232798 | A1 | 8/2015 | Zhou et al. |

FOREIGN PATENT DOCUMENTS

| | | |
|---|---|---|
| CN | 1491121 A | 4/2004 |
| CN | 101455913 A | 6/2009 |
| CN | 102091449 A | 6/2011 |
| CN | 103687814 A | 3/2014 |
| CN | 103691176 A | 4/2014 |
| CN | 103844904 A | 6/2014 |
| CN | 204569591 U | 8/2015 |
| DE | 102014116592 A1 | 5/2016 |
| EP | 1862713 A1 | 5/2007 |
| JP | S57-130516 A | 8/1982 |
| JP | S61-064308 A | 2/1986 |
| JP | 9-303582 A | 11/1997 |
| JP | 2001-179243 A | 3/2001 |
| JP | 3724941 B2 | 12/2005 |
| JP | 4038545 B1 | 1/2008 |
| JP | 2008132430 A | 6/2008 |
| JP | 5189549 B2 | 4/2013 |
| JP | 2016-067986 A | 5/2016 |
| NO | 2014121924 A1 | 8/2014 |
| WO | 2002062473 A2 | 8/2002 |
| WO | 2004069369 A2 | 8/2004 |

\* cited by examiner

WATER FILTRATION DEVICE WITH SEQUENTIAL BACKWASH AND METHOD OF ITS OPERATION

The present application claims priority to International Application No. PCT/EP2020/087712, filed Dec. 22, 2020, and U.S. Patent Application No. 62/952,997, filed Dec. 23, 2019, each of which are herein incorporated by reference in their entirety.

FIELD OF THE INVENTION

The present invention relates to a water filtration device and a method of its operation.

BACKGROUND OF THE INVENTION

AU2016 240897 discloses a water filtration system with six water filters arranged around a central axis, where the filters are backwashed one by one with the filtered water from the other filters.

This system has got some disadvantages. A separation valve (numeral 28 in FIG. 10A and 10B of AU2016 240897) separates the backwash water from the clean water during the backwash cycle. Accordingly, the valve member is exposed to backwash water on one side and clean water on the opposite side. After the backwashing, the valve is opened for a final flushing cycle, letting clean water pass through the valve. The fact that this separation valve periodically is exposed to dirty water from the backwashing and then opened towards clean water implies a risk that the clean water upstream of the separation valve exposed to germs that are taken up from the backwash and which then reside in the valve. For example, a turning valve member inside the valve may drag germs into the clean water compartment upstream of the valve and contaminate it with subsequent germ breeding upstream of the valve, which implies a health hazard.

The principle of using filtered water from one filter for backwashing another filter and using a switching valve is disclosed in WO2014/121924, U.S. Pat. Nos. 4,504,390 and 9,056,267. In the latter, the switching backwashing cycles is done by a single rotating valve member inside a housing. During backwash, tap water enters an inlet and flows from the clean water region through the filter to the dirt water region, which are on opposite sides of the valve member, separated only by a rubber packing. This implies disadvantages, in that the rubber packing in case of wear would not properly separate the clean water region from the dirt water region. This implies a risk that the clean water side gets contaminated by the germs from the dirt water region, leading to breeding of germs in the clan water side of the valve. Such wear of rubber packing is likely because it is exposed to rotation of the valve within the rubber packing.

Other backwashing mechanisms are disclosed in JP5189549B2, CN103691176, CN101455913, EP1862713, JP2008132430.

U.S. Pat. No. 6,413,423 discloses a different water filtration system with a separation between the contaminated part of the filtration system. An upper contaminated part of a valve system is separated from a lower clean part of the valve system through a gasket. Also this system comprises disadvantages in that wear of this gasket would lead to contaminate water entering the clean water chamber and lead to germ breeding therein.

As it appears from the above, in water filtration systems, there is a risk for contamination of the clean water side of the filter during prolonged use. Accordingly, there is a need for improvements U.S. Pat. No. 5,326,033 discloses a squeeze valve, where a hose is closed by pressing on it with a lever or cam, for a spray gun. Typically, hose systems with cam-driven squeezing valves, where hoses are closed by pressing on them with a lever or cam, have been disclosed in the prior art, for example in DE102014116592, JP3724941B2, JP9-303582, JP4038545B1, JPH09303582, US2015/232798, U.S. Pat. Nos. 4,282,902, and 5,326,033. However, the uses of such systems involve addition of medicine and chemicals to fluid. But such systems have not yet been proposed for water filtration systems, despite apparent advantages as outlined in more detail in the following.

U.S. Pat. No. 4,773,991 discloses a water purification system for filtering tap water. An electrical valve upstream of a pre-filter is used for cutting off water supply. A pressure regulator downstream of the pre-filter and downstream of a pump assures that a water pressure of 20 psi is used in the reverse osmosis module.

Chinese utility model CN204569591U by Xuecheng et al and assigned to Jingxi Sowing Science and Technology Co Ltd discloses a water purification system in which a beck pressure regulator is provided downstream of the reverse osmosis module. An electrical valve is used for cutting off the water supply upstream of the reverse osmosis module.

Chinese patent application CN103844904 discloses a water filtration unit in which a control panel with a card reader is used to open for water flow when the user presents a readable card. The activation at the control panel electrically activates a solenoid valve that is located between a water supply with pressure valve and the filter units. It discloses water flow from the tap water line, through a pressure regulator, through an on/off valve, through the pre-filter and final filter and into a container. The activation with a card reader is complicated.

It would be desirable to provide a water filtration device that is simple but safe and which is also applicable in case of emergency situations.

DESCRIPTION/SUMMARY OF THE INVENTION

It is an objective to provide an improvement in the art. Especially, it is an objective to prevent the risk for contamination of clean water sides of water filtration systems with germs from backwash water. This is achieved by a water filtration device and method for its operation as explained below.

In particular, the device comprises a tubing system with various hoses for connection between different parts of the filtration system and a multi flow arrangement with a plurality of compartment through which said plurality of hoses extend, wherein each of the compartments comprises a clamping function for closing one of the plurality of hoses extending through the corresponding compartment by clamping it and for opening the hoses by releasing the clamping function. The hoses are closed in predetermined sequences by clamping them for thereby controlling the direction of the flow of water through the tubing system. In comparison with prior art water filters, the risk for contamination of the clean water side of the filter system is eliminated.

In particular, the water filtration device comprises
a dirt water inlet for receiving dirt water for filtration;

a clean water outlet for dispensing of filtered water for consumption;

a backwash water outlet for release of backwash water from the device;

a filtration system, for filtering dirt water from the dirt water inlet and for providing clean water to the clean water outlet;

a tubing system with various hoses connecting the dirt water inlet and the clean water outlet with the filtration system as well as the backwash water release through the back-wash water outlet, a multi flow arrangement with a plurality of compartment through which said hoses extend, wherein each of the compartments comprises a clamping function for closing one of the hoses extending through the corresponding compartment by clamping it; for example the compartments comprises a clamping member arranged to squeeze one of the hoses when pressed against the corresponding hose.

The device is configured for activating the clamping function of the compartments in the multi flow arrangement sequentially, for example automatically, for closing and opening the hoses for flow in accordance with a predetermined sequence for shifting between the filtration mode and the backwash mode.

Advantageously, the device comprises a panel for user operation of the device. Optionally, the panel comprises a switch for switching between on and off for filtration of water by automated or selective manual operation of the switch between an on-state and an off-state. Advantageously, the panel is functionally connected to the clamping function for operating the clamping function in the multi flow arrangement by user operation. In this case, activation of the clamping function, for example for on and off of the filtration, is caused by the user operation, for example manual user operation from the panel, or by user operation that induces an automated sequence of operational stages.

In some concrete embodiments, the filtration system comprises a first water filter, and optionally a second filter, for filtering dirt water and for providing filtered water.

Typically, the first water filter comprises a first filter housing with a first filter element inside. The first filter element is filtering bacteria, parasites, and other types of micrometer-sized and sub-micrometer-sized germs, and optionally even certain viruses. For example, the first filter element comprises a plurality of hollow fiber microfiltration and/or ultrafiltration membranes. Alternatively, the filter element comprises a roll of pleated microporous material with microfiltration or ultrafiltration purposes. It is recalled that an ultrafiltration filter has pores that filter particles of a size down to a minimum size, for example a minimum size in the range of 0.001 to 0.01 micrometer, whereas a microfiltration filter has pores that filter particles of a size down to a minimum size of around 0.1 micron.

For example, the first water filter is configured for filtering microbes that have a size below a predetermined water filter limit, wherein the predetermined water filter limit is in the range of 0.01 to 0.5 micrometer, optionally in the range of 0.05 to 0.2 micrometers.

In order to assure a high flow of water through the filtration system microfiltration is preferred with a filtration of particles having a size down to 0.1 micrometer.

Advantageously, bacteria are reduced by 99.9999% (log 6). Optionally, viruses are reduced by 99.99% (log 4). Optionally protozoan and parasites are reduced by 99.9% (log 3). Advantageously, all three criteria are met.

Optionally, in order to prevent early clogging of the first filter element, a pre-filter is provided for filtering larger particles and microbes upstream of the first water filter. For this case, the pre-filter is arranged in the flow path between the dirt water inlet and the first water filter. For example, the pre-filter is configured for filtering particular matter with a size larger than a predetermined pre-filter limit. For example, the predetermined pre-filter limit is in the range of 150-10 micrometer, typically 10 micrometers.

For example, the pre-filter comprises multiple layers, for example three layers of pre-filtration, which have an increasing pre-filtration performance by decreasing pore size from one pre-filter element to the next. A pre-filter support is optionally used for holding the pre-filter elements in place. For example, the pre-filter support is arranged for sealing purposes against a dirt water inlet.

In practical embodiments, the first water filter comprises a first water inlet at an upstream side of the first water filter, and correspondingly to an upstream side of the first filter element, for receiving water for filtration by the first water filter. The upstream side is the influent side of the filter element during filtration. The first water filter further comprises a first water outlet at a downstream side of the first water filter, and correspondingly to an downstream side of the first filter element, for delivering water filtered by the first water filter. The first water filter has a water flow direction during filtration from the upstream to the downstream side and a water flow direction during backwash from the downstream side to the upstream side.

For example, the tubing system comprises a first inflow hose that is connected to the first water filter and provided as part of a flow path from the dirt water inlet to the first water inlet for flow of water through the first inflow hose to the first water inlet. For the typical configuration with a pre-filter upstream of the first water filter, the first inflow hose is connected to the pre-filter at its first end and to the first water filter at its second and opposite end.

The term "connected" with respect to a hose and a filter should be understood as a water-flow connection between the hose and the filter for flow of water from and to the filter through the hose, however such that no other filtering elements or chemically active elements are in the flow path between the hose and the corresponding filter. In case that the hose is attached to a rigid hollow tube that is attached to a filter, where the flow is from or to the hose, through the tube, and into or out of the filter, the hose would also be regarded as "connected" to the filter, because the rigid tube is merely an extension of the hose for assuring a direct flow between the hose and the filter.

The plurality of hoses also comprises a clean water hose in a flow path from the filtration system to the clean water outlet for release of clean water from the device when the device is in filtration mode.

Typically, the clean water hose is connected to a dispensing element, for example a dispensing tap, for release of water from the device for consumption of the filtered water. However, the clean water hose can also be connected to a storage container which is used for dispensing water for consumption.

Optionally, the clean water hose is used for providing water for backwash purposes, for example directly for backwash of a second water filter or for backwash of the first water filter after storage of the clean water in a clean water container, the clean water container optionally being part of the device.

Backwash water is released from the device through a backwash water outlet. For this purpose, the tubing system comprises a first backwash hose in the flow path from the first water filter and to the backwash water outlet. For example, the backwash hose is connected to the first water outlet of the first water filter and/or connected to the backwash water outlet for flow of backwash water from the first water filter to the backwash water outlet during backwash of the first water filter when the device is in backwash mode. In concrete embodiments, the plurality of hoses comprises a backwash hose in a flow path from the filtration system to the backwash outlet for backwash water release from the device through the backwash hose and through the water outlet during backwash of the filtration system.

For example, the clamping function for each compartment comprises an electrical pinch valve activatable in accordance with the predetermined sequence by corresponding user operation on the panel.

Optionally, the device comprises a pinch valve controller configured for receiving user command by user operation from the panel and configured for activating the pinch valves of the multi flow arrangement by clamping, for example automatic clamping in accordance with the predetermined sequence for automatically shifting between the filtration mode and the backwash mode upon user command.

In some embodiments, the panel comprises a manually rotatable handle that is functionally connected to the clamping function for operating the clamping function in the multi flow arrangement by manual rotation of the handle. For example, the manual rotation of the handle in a single direction causing the sequential closing and opening of the hoses in accordance with the predetermined sequence for shifting between the filtration mode and the backwash mode.

Optionally, the handle operates the electrical pinch valves. Alternatively, it operates a cam shaft as explained in the following.

For example, the device comprises a cam shaft that is rotatable with respect to a rotation axis and with multiple cams provided in parallel planes on the cam shaft for rotation therewith and perpendicular with the rotation axis, each cam being arranged for activating the clamping function only when attaining a predetermined individual angular clamping position during rotation of the cam shaft; wherein the cams are provided at different angular locations of the cam shaft for closing the hoses in accordance with a predetermined sequence when the cam shaft is rotated. This is used for shifting between a filtration mode of the device to a backwash mode for backwash of the filtration system by the rotation.

In the first filtration mode, the method comprises activating the clamping function by one of the cams for closing a backwash hose by clamping it in the multi flow arrangement, for example by pressing a corresponding one of the clamping members by one of the cams onto the backwash hose, while maintaining water flow through an inflow hose into the filtration system and out of the filtration system into a clean water hose.

Then, the cam shaft is rotated from the first angular orientation into a second angular orientation for a first backwash mode for clamping and closing the flow through the inflow hose in the multi flow arrangement by activating a clamping of the inflow hose in another compartment by another one of the cams, for example by pressing another corresponding one of the clamping members by another of the cams onto the inflow hose, while maintaining flow of clean water in the multi flow arrangement through a clean water hose in reverse into the filtration system and flow out of the filtration system through the backwash hose for flow of clean water from the clean water hose into the filtration system.

In some embodiments, the casing comprises a panel that is user accessible and indicative for the user with respect to its function and which comprises a hand-operated cam driver connected to the cam shaft for manually rotating the cam shaft. For manual rotation of the cam driver, a corresponding handle is provided. Alternatively, the cam shaft is rotated by a motor.

Optionally, the cam-driver is rotatable. Optionally, it is rotatable with a rotation axis parallel with, optionally aligned with, an axis of rotation of the cam shaft. However, this is not strictly necessary. For example, a gearing can be provided between the cam driver and the cam axis.

Advantageously, the handle is restricted to rotation in only one direction in order to safeguard a one-way clamping sequence on the hoses, for example by the cam shaft. By the one-way-only manual operation of the handle, an error in a backwash sequence is avoided.

In practical embodiments, the device has a first filtration mode wherein it is configured for clamping and closing the first backwash hose in the multi flow arrangement by activating a clamping function in one of the compartments, for example by pressing a corresponding one of the clamping members by one of the cams, while maintaining flow through the inflow hose and the clean water hose or a first angular orientation of the handle, for example the cam shaft.

As a further practical embodiment, the device has a first backwash mode wherein it is configured for clamping and closing the first inflow hose in the multi flow arrangement by activating a clamping function on the first inflow hose, for example by pressing another corresponding one of the clamping members by another of the cams, while maintaining flow of clean water from the clean water hose in reverse through the first backwash hose in the multi flow arrangement for a second angular orientation of the handle, for example cam shaft, wherein the second orientation is different from the first orientation.

Optionally, the filtration system comprises a second water filter for filtering dirt water and for providing filtered water. The second water filter is typically but not necessarily provided with identical specifications as the first water filter. For example, it contains the same type of filter element as the first water filter.

Optionally, the first and second water filter function in parallel during normal filtration of the water, which doubles the capacity. Alternatively, the second water filter is used when the first water filter is exhausted and not filtering properly any more. A further advantage of using two water filters instead of one is the use of one filter to provide clean water for backwashing the other filter.

In some embodiments, the device is configured for filtering of water by the second water filter and supply this filtered water in reverse flow through the first water filter for backwashing the first water filter during filtration of the water by the second water filter and with the water filtered by the second water filter. Advantageously, in addition, the device is configured for filtering of water from the first water filter and supply this filtered water in reverse flow through the second water filter for backwashing the second water filter during filtration of the water by the first water filter and with the water filtered by the first water filter.

Optionally, the device is configured for a corresponding backwash flush sequentially, as part of the predetermined sequence, from the filtration mode for normal water filtration by both water filters, to a first backwash mode with backwash of the first water filter with filtered water from the second water filter, and to a second backwash mode with backwash of the second water filter with filtered water from the first water filter.

As a further option, the device is configured for forward flush as part of the predetermined sequence from the first backwash mode to a first forward flush mode with forward flush of the first water filter, typically prior to the second backwash mode, from the second backwash mode to a second forward flush mode with forward flush of the second water filter.

In a practical embodiment, the second water filter, similarly to the first water filter, comprises a second water inlet at an upstream side of the second water filter for receiving dirt water for filtration by the second water filter and a second water outlet at a downstream side of the second water filter for delivering water filtered by the second water filter. The second water filter has a water flow direction during filtration from its upstream to its downstream side and a water flow direction during backwash from its downstream side to its upstream side.

For example, the clean water hose is also connected to the second water outlet for receiving filtered water from the second water filter. This is advantageous when the filters are used in parallel and when the second water filter is used for providing clean water for backwashing the first water filter.

Accordingly, in more detail, in the first backwash mode, the device is filtering of water by the second water filter and supply of this filtered water to the clean water hose and from the clean water hose in reverse flow through the first water filter for backwashing the first water filter during filtration of the water by the second water filter and with the water filtered by the second water filter.

Optionally, the device further comprises a second inflow hose connected to the second water filter and provided as part of a flow path from the dirt water inlet to the second water inlet for flow of water through the second inflow hose to the second water inlet. For the typical configuration with a pre-filter upstream of the second water filter, the second inflow hose is connected to the pre-filter at its first end and to the second water filter at its second and opposite end.

Optionally, the device further comprises a second backwash hose connected between the backwash water outlet and the upstream side of the second water filter for flow of backwash water from the second water filter to the backwash water outlet during backwash of the second water filter.

In this case, for regulating flow through these hoses, the second inflow hose and the second backwash hose extend through corresponding compartments in the multi flow arrangement.

For the configuration where the first and second water filter are used in a parallel configuration for producing clean water the device in the first filtration mode is clamping and closing the second backwash hose in the multi flow arrangement by activating a clamping function, while maintaining flow in the multi flow arrangement through the second inflow hose and the clean water hose.

For the configuration where the second water filter is used for producing clean water that is used for backwashing the first water filter in the first backwash mode, the device is clamping and closing the second backwash hose in the multi flow arrangement while maintaining flow in the multi flow arrangement through the second inflow hose. During backwash of the first water filter, filtration of water is maintained by the second water filter as well as flow of water from the second water filter into the clean water tube and further in reverse from the clean water into the first water filter.

The backwash is an efficient method to increase the water filtration capabilities of membrane filters elements. However, once the backwash has been made, be it in a device with only the first water filter or in a device with two water filters, as just described, for example two water filters with identical specifications, a further improvement can be achieved with a forward flus in order to flush out particulate matter and other biological debris by leading water along the upstream side of the filter element.

In practical embodiments where forward flush is incorporated for the first water filter, the first water filter also comprises a first flush outlet at the upstream side of the first water filter for release of water during forward flush with a water flow into the first water inlet, through the first water filter, and out of the first flush outlet for forward flushing along the upstream side inside the first water filter. In case that the flush outlet is not only used for forward flush but also for the backwash, the first backwash hose is connected to the first flush outlet.

Accordingly, the device further comprises a first forward flush mode for a third angular orientation of the cam shaft and/or handle wherein the third orientation is different from the first and second orientation. In the first forward flush mode, the device is clamping and closing the clean water hose for preventing filtered water flow from the first water filter into the clean water hose, and for maintaining flow in the multi flow arrangement through the first inflow hose and the first backwash hose. Accordingly, water from the dirt water inlet, or from the pre-filter if the latter is implemented, flows from the first inflow hose into the first water filter through the upstream side of the first water filter and out of the first water filter through the first flush outlet. Thus, the water flow is along the upstream side of the first filter element in the first water filter and drags particulate and other biological matter along during the forward flush procedure.

For the event that the device comprises a first and second water filter, as already discussed above, the second water filter is advantageously backwashed by the clean water produced by the first water filter during backwashing of the second water filter.

In this case, the device further comprises a second backwash mode for a fourth angular orientation of the cam shaft and/or handle, wherein the fourth orientation is different from the first and second orientation and different from an optional third orientation.

In practical embodiments for this second backwash mode, the device is filtering water by the first water filter to supply this filtered water to the clean water hose and from the clean water hose in reverse flow through the second water filter for backwashing the second water filter with the water filtered by the first water filter during filtration of the water by the first water filter. Further, the device in the second backwash mode is clamping and closing the first backwash hose in the multi flow arrangement while maintaining flow in the multi flow arrangement through the first inflow hose and maintaining filtration of water by the first water filter and flow thereof into the clean water hose and further in reverse into the second water filter.

Similarly to the forward flush of the first water filter, a further improvement can be achieved with a forward flush of the second water filter after its backwash in order to flush out particulate matter and other biological debris by leading water through the second water filter, along the upstream side of the second filter element in the second water filter.

In practical embodiments for the forward flush of the second water filter, the second water filter comprises a second flush outlet at the upstream side of the second water filter for release of water during forward flush in the second water filter with a water flow into the second water inlet, through the second water filter, and out of the second flush outlet for forward flushing along the upstream side inside the second water filter, especially the along the upstream side of the second filter element inside the housing of the second water filter; wherein the second backwash hose is connected to the second flush outlet.

For this case, the device further comprises a second forward flush mode for a fifth angular orientation of the cam shaft and/or handle, wherein the fifth orientation is different from the, first, second, third, and fourth orientation.

In the second forward flush mode, the device is clamping and closing the clean water hose for preventing flow of filtered water from the first and second water filter into the clean water hose, and the device is maintaining flow in the multi flow arrangement through the second inflow hose and the second backwash hose. Thus, water flows from the second inflow hose into the second water filter, through the upstream side of the second water filter, and out of the second water filter through the second flush outlet.

In case that the flush outlet is not only used for forward flush but also for the backwash, the first backwash hose is connected to the first flush outlet.

When two filters are employed, the device is advantageously configured for a backwash sequence by turning the handle, for example cam drive, in steps from the first orientation for normal water filtration by both filters to the second orientation in the first backwash mode with backwash of the first water filter with filtered water only from the second water filter, while filtering the water by the second water filter during backwash of the first filter, and further to a further orientation in the second backwash mode with backwash of the second water filter with filtered water only from the first water filter, while filtering the water by the first water filter during backwash of the second filter.

If for the two filters also forward flush is applied, the device is advantageously configured for a backwash and forward flush sequence by turning the handle and/or cam-driver in steps from the first orientation for normal water filtration by both filters
to the second orientation in the first backwash mode with backwash of the first water filter by filtered water from the second water filter, while filtering the water by the second water filter during backwash of the first filter,
and further to the third orientation in the first forward flush mode with forward flush of the first water filter,
and further to the fourth orientation in the second backwash mode with backwash of the second water filter with filtered water from the first water filter, while filtering the water by the first water filter during backwash of the second filter,
and further to the fifth orientation in the second forward flush mode with forward flush of the second water filter.

Although, the principles for the device apply in general, they have particular advantages for a small scale emergency device, where clean water is needed at the point of use when no proper clean water supply is available. For this and other particular use, the device is advantageously a portable device with a weight and size portable by a single human, for example in the range of 5-20 kg. Optionally, the device comprises a casing, wherein the dirt water inlet, the backwash water outlet, the filtration system, the hoses, the multi flow arrangement, and the optional cam shaft are provided in the casing.

In some embodiments, the panel comprises a switch for switching between on and off for filtration of water by selective user operation, for example manual operation of the switch, between an on-state and an off-state.

For example, the panel comprises a manually rotatable handle that is functionally connected to the clamping function for operating the clamping function in the multi flow arrangement by manual rotation of the handle, the manual rotation of the handle in a single direction causing the sequential closing and opening of the hoses in accordance with the predetermined sequence for shifting between the filtration mode and the backwash mode. Optionally, the switch comprises a blocking member for blocking rotation of the handle when the switch is in the off-state.

For example, the switch comprises a blocking member for blocking rotation of the cam driver when the switch is in the off-state. Especially, when the switch is in the on-state, water flows out of the device, for example out of a tap, which indicates to the user that there is water flow through the device and not blockage by fault. In this event, water is also available for backwash. The backwash cycle can then be done by the manual cam driver, while the switch is in in the on-state, which is advanced step by step to through the backwash, and optionally forward flush, sequential cycle, until the cam driver ends again in the filtering orientation, and the user is informed thereof by clean water again flowing out of the device, for example out of the tap. This assures an easy and intuitive control and understanding by the user of the performed backwash cycle. Especially with two filters and both backwash and forward flush, users are easily overwhelmed, if the handling becomes technically complex.

For preventing damage to the filtration system due to overpressure, the device advantageously comprises a pressure regulator in a flow path between the dirt water inlet and the filtration system for limiting the pressure to below a predetermined value. For example, the pressure regulator reduces the pressure on the downstream side of the pressure regulator in order to prevent overload. For example, it limits the pressure to less than a predetermines value above ambient pressure on the downstream side that will guarantee the integrity of the downstream system. For example, the predetermined value is in the range of 0.2 to 2 bar, optionally 0.5 to 2 bar, above ambient atmospheric pressure. 1 bar equals 100,000 Pascal.

Optionally, for preventing overload in the filtration system and minimize risk for water loss through leaks, the switch in the off-state is configured for blocking water flow in the flow path downstream of the pressure regulator and upstream of the filtration system. This clamping switch additionally acts as a shut off valve during cleaning/maintenance of the pre-filter, as it cuts off pressure inside the system. This is an advantage in that it prevents the user from having to disconnect the inlet when cleaning of the pre-filter is necessary.

In some practical embodiments, a dirt water hose is provided in a dirt water flow path between the pressure regulator and the filtration system. For example, if a pre-filter is part of the device, the first water hose connects the pressure regulator with the pre-filter.

Optionally, the switch comprises a clamp for clamping the dirt water hose and for preventing flow through the dirt water hose when the clamp is activated in the off-state of the switch. Optionally, the clamping function is by a cam, as explained above. Alternatively, the clamping function is achieved by a pinch valve.

In some embodiments, in order to remove chemical contaminants, for example iodine, chlorine, lead or arsenic, a decontamination stage is included downstream of the water filter or water filters so that the water flows through the decontamination stage prior to being released through the clean water outlet, for example the tap. For example, the decontamination stage comprises flow through activated carbon for removing odour and chlorine and/or iodine, especially of chlorine and/or iodine have been added to the water during its flow through the device in order kill the microbes or at least to reduce the concentration of microbes and for preventing breeding of microbes in the filtration system as well as the tubes.

SHORT DESCRIPTION OF THE DRAWINGS

The invention will be explained in more detail with reference to the drawing, where FIG. 1 shows a portable filtration device according to the invention;

Figures 8A, 8B, 8C, 8D:
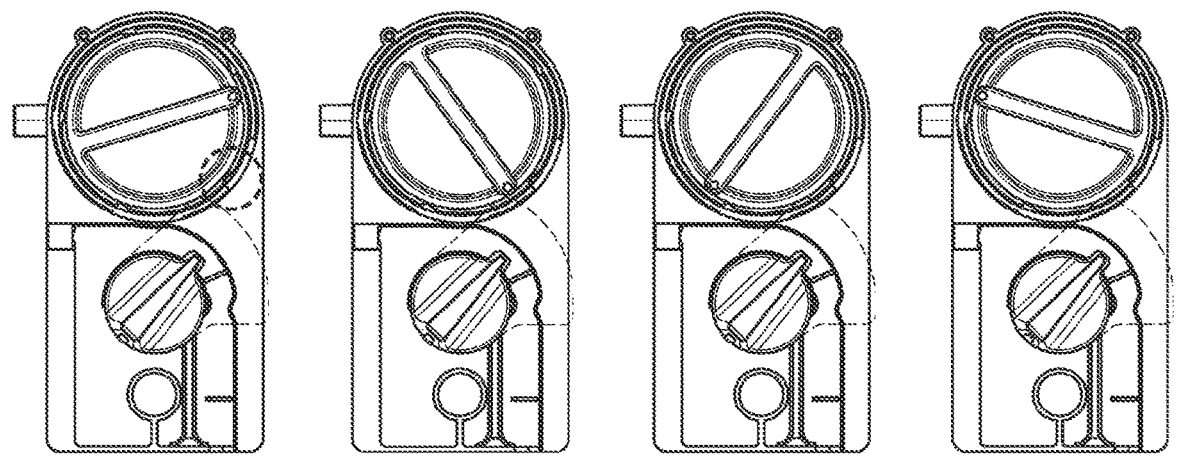
Figure 8E:
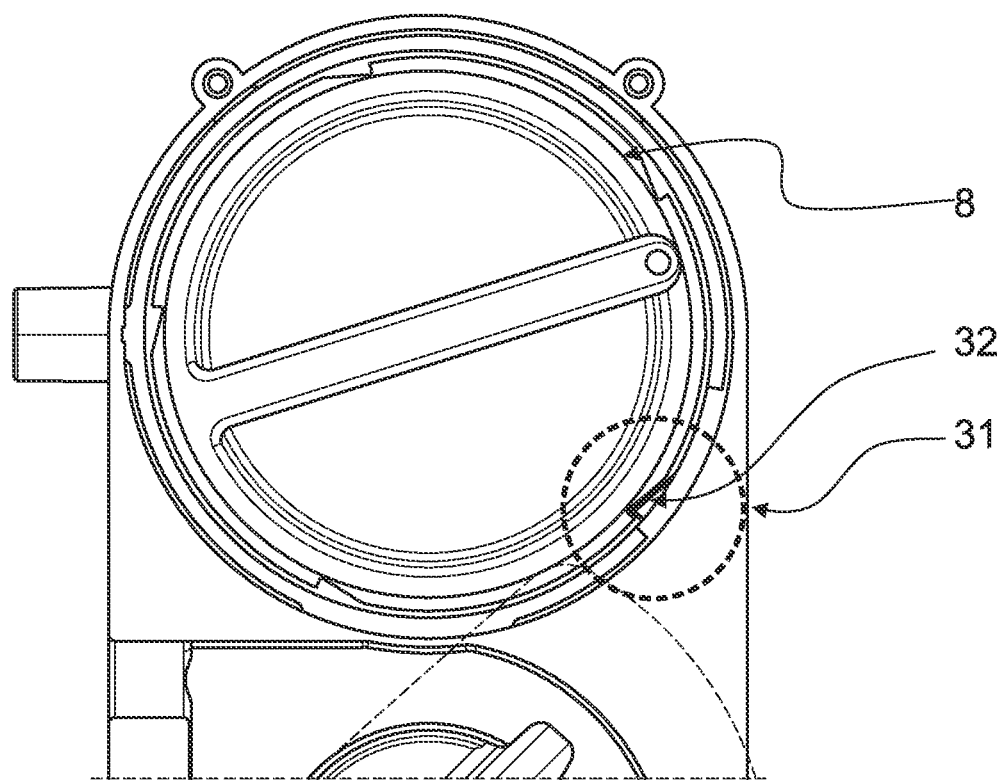
Figure 9A:
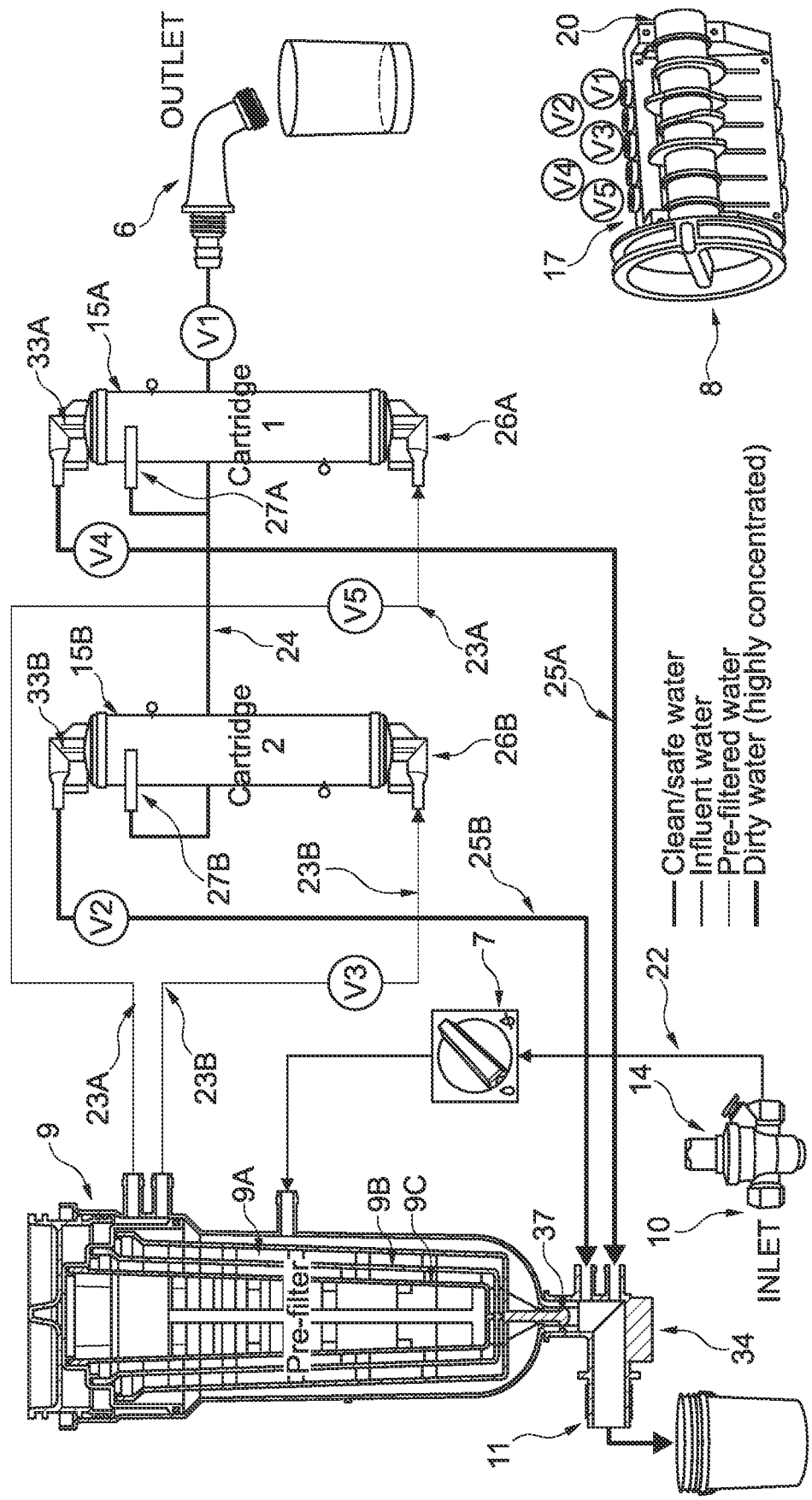
Figure 9B:
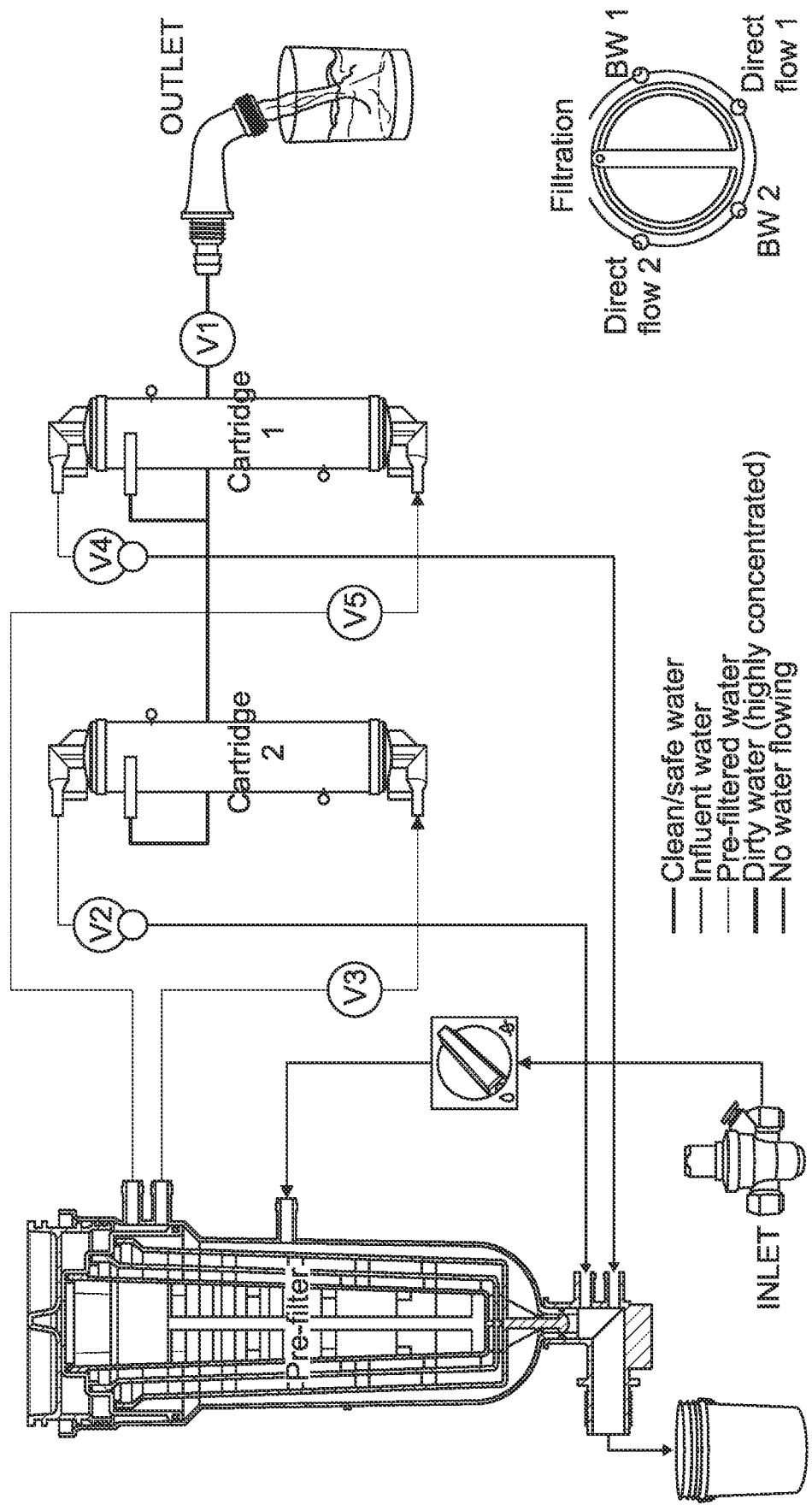
Figure 9C:
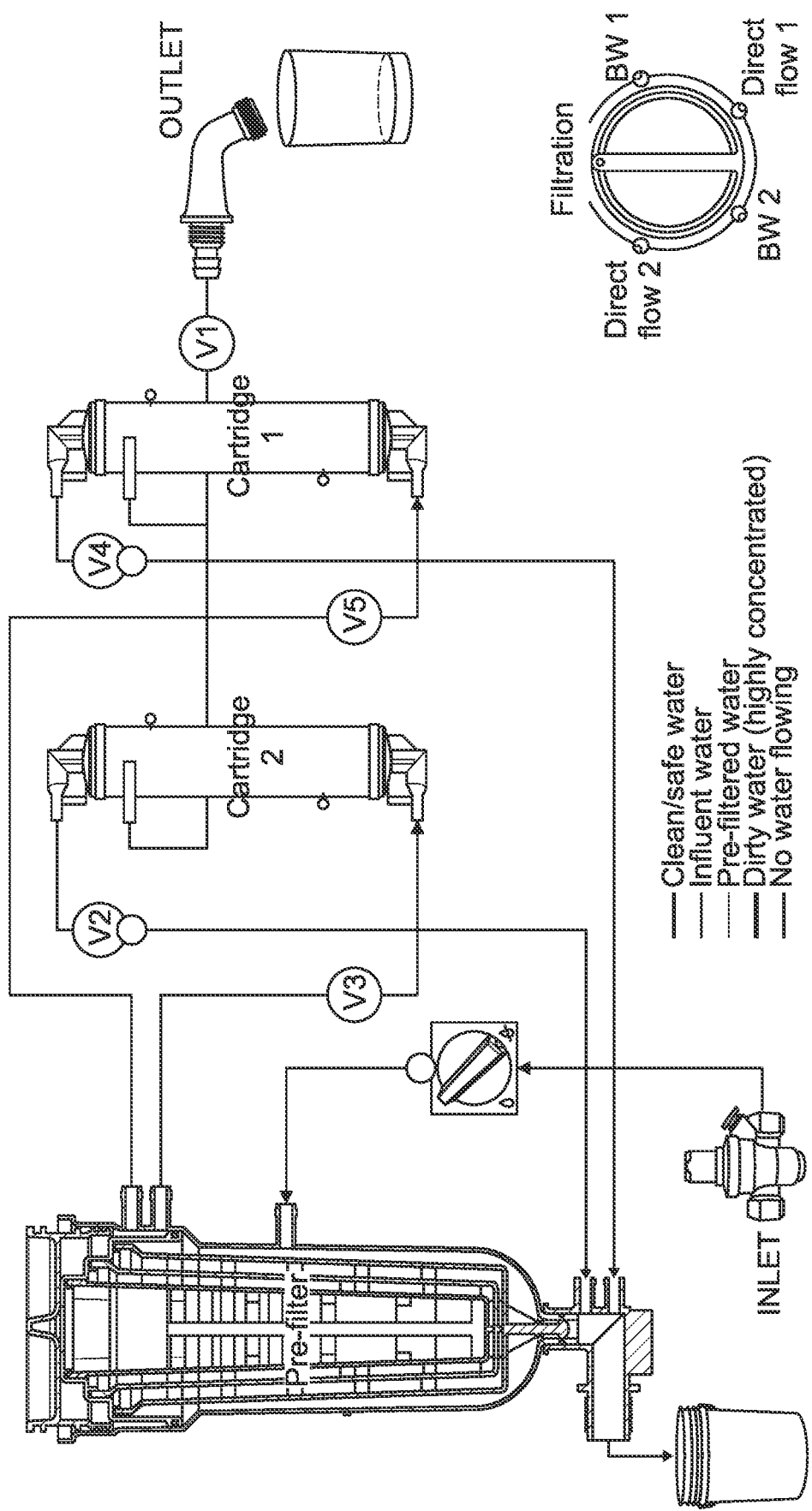
Figure 9D:
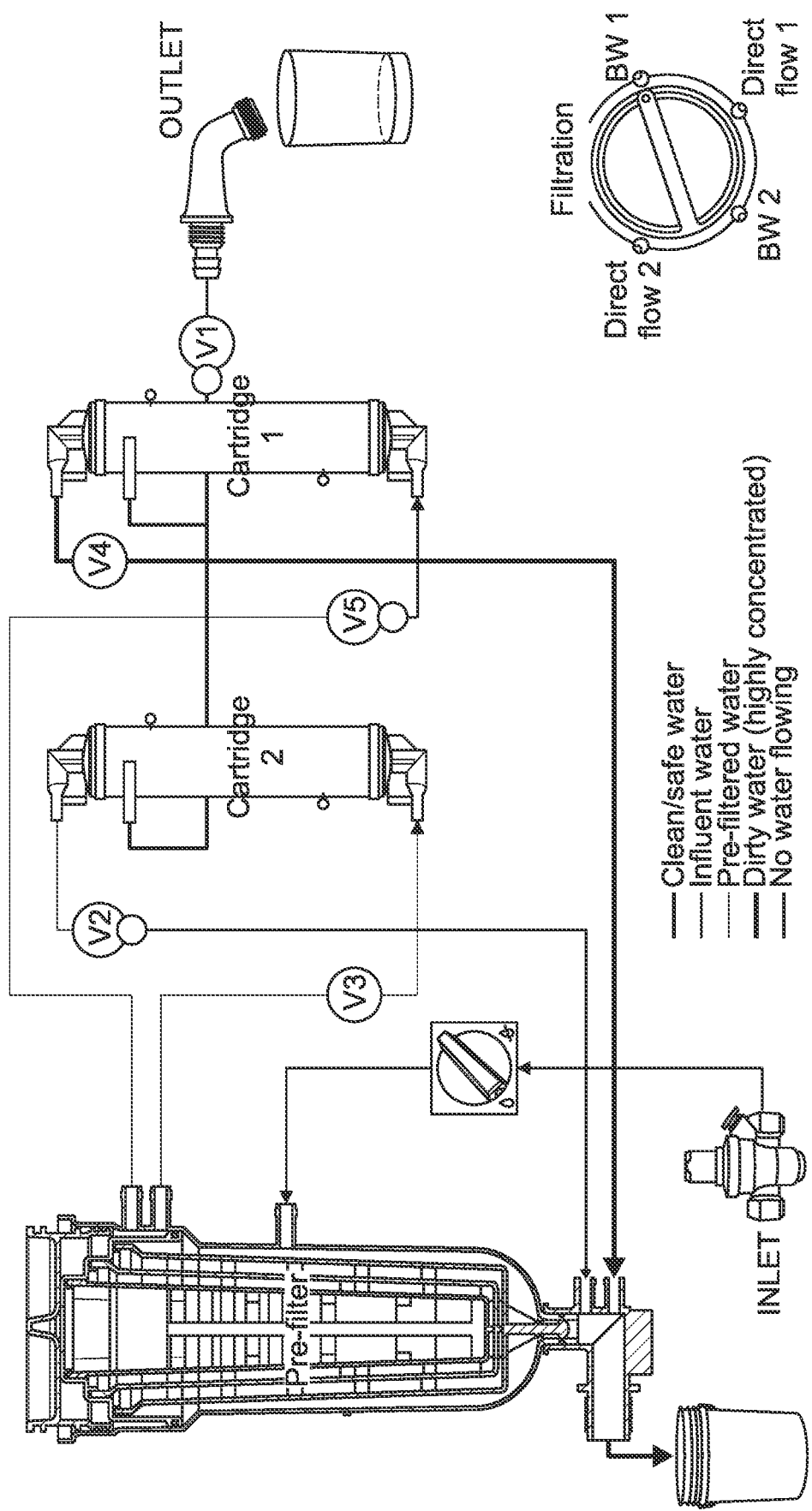
Figure 9E:
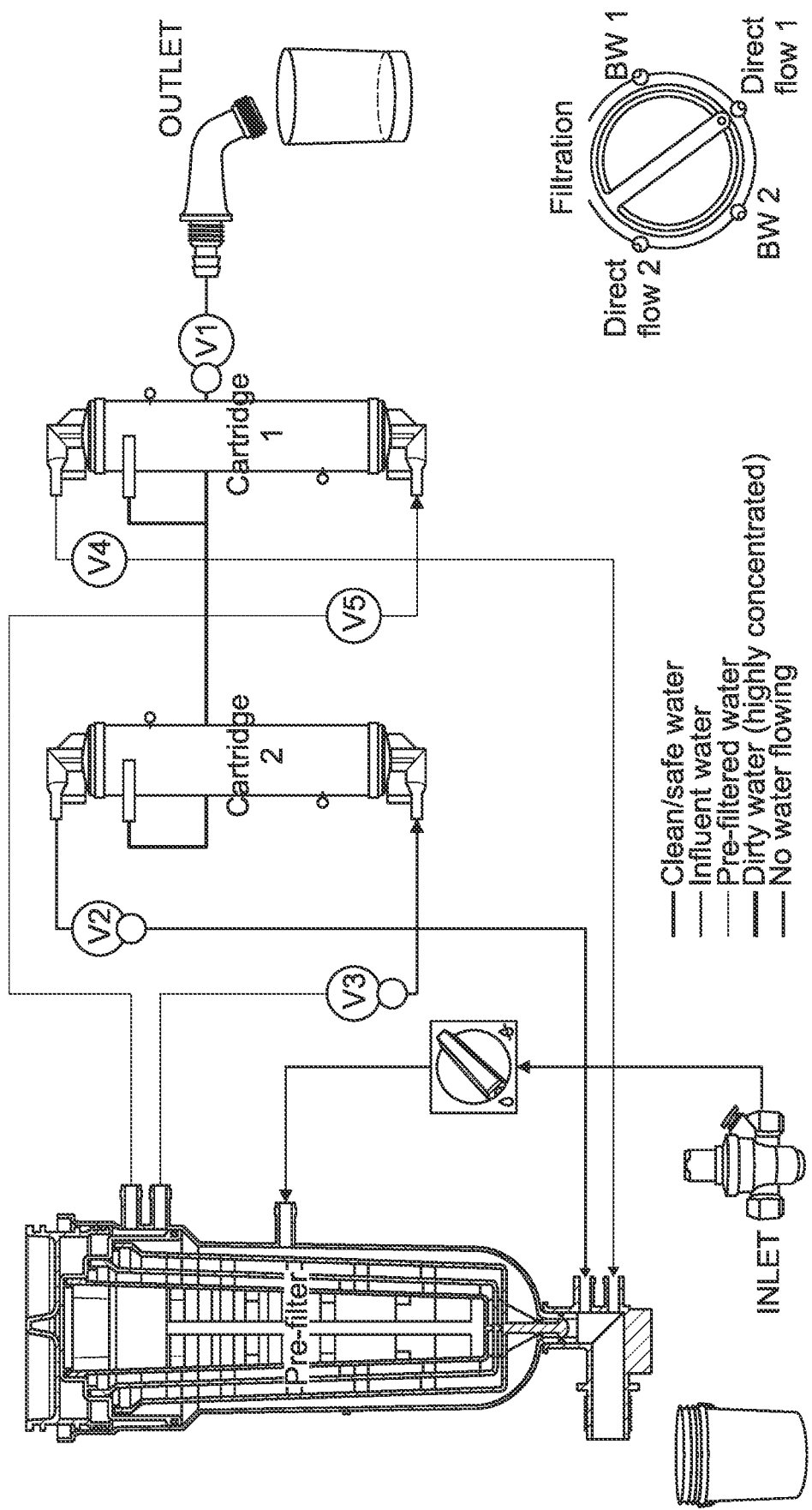
Figure 9F:
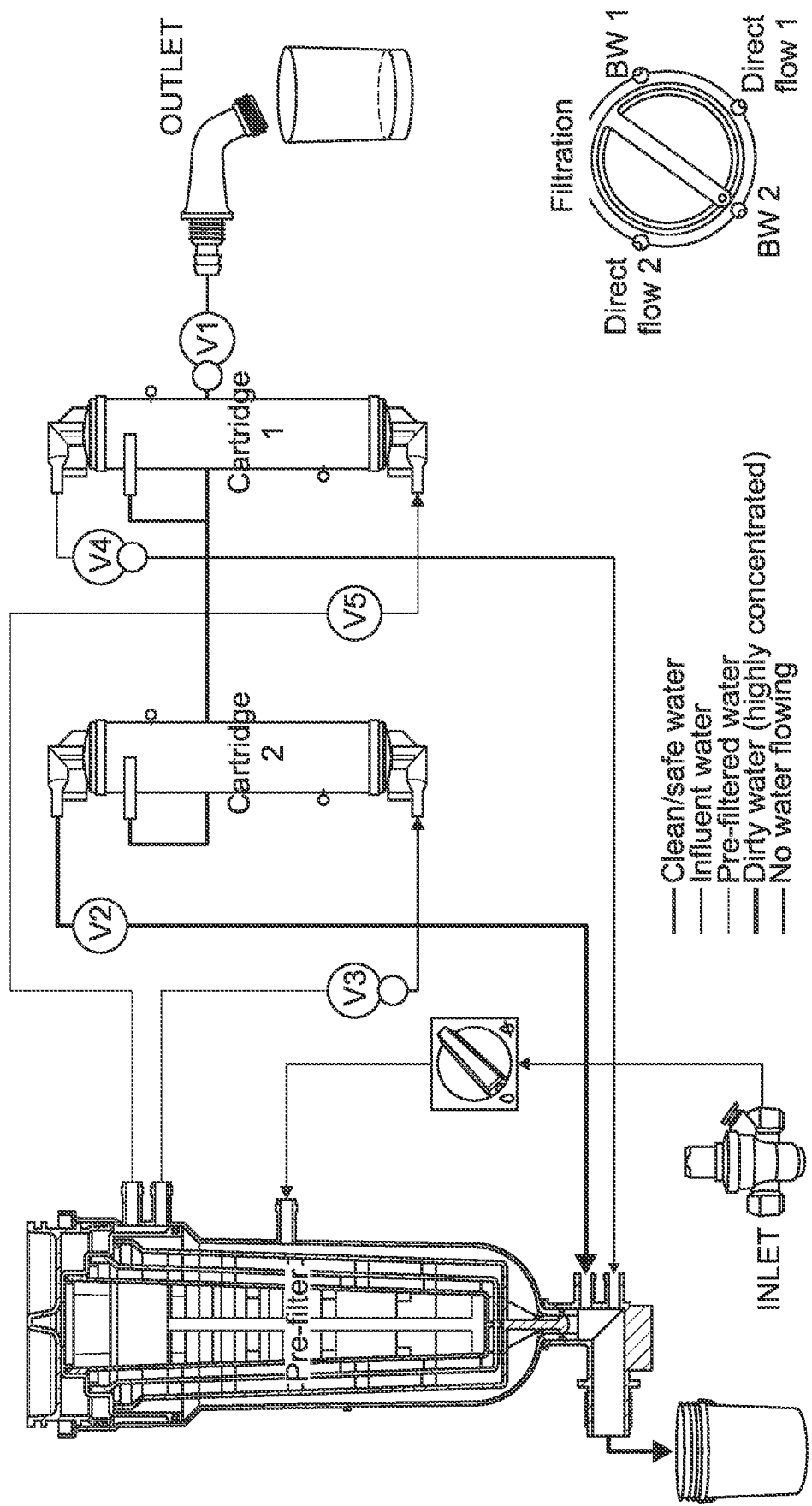
Figure 9G:
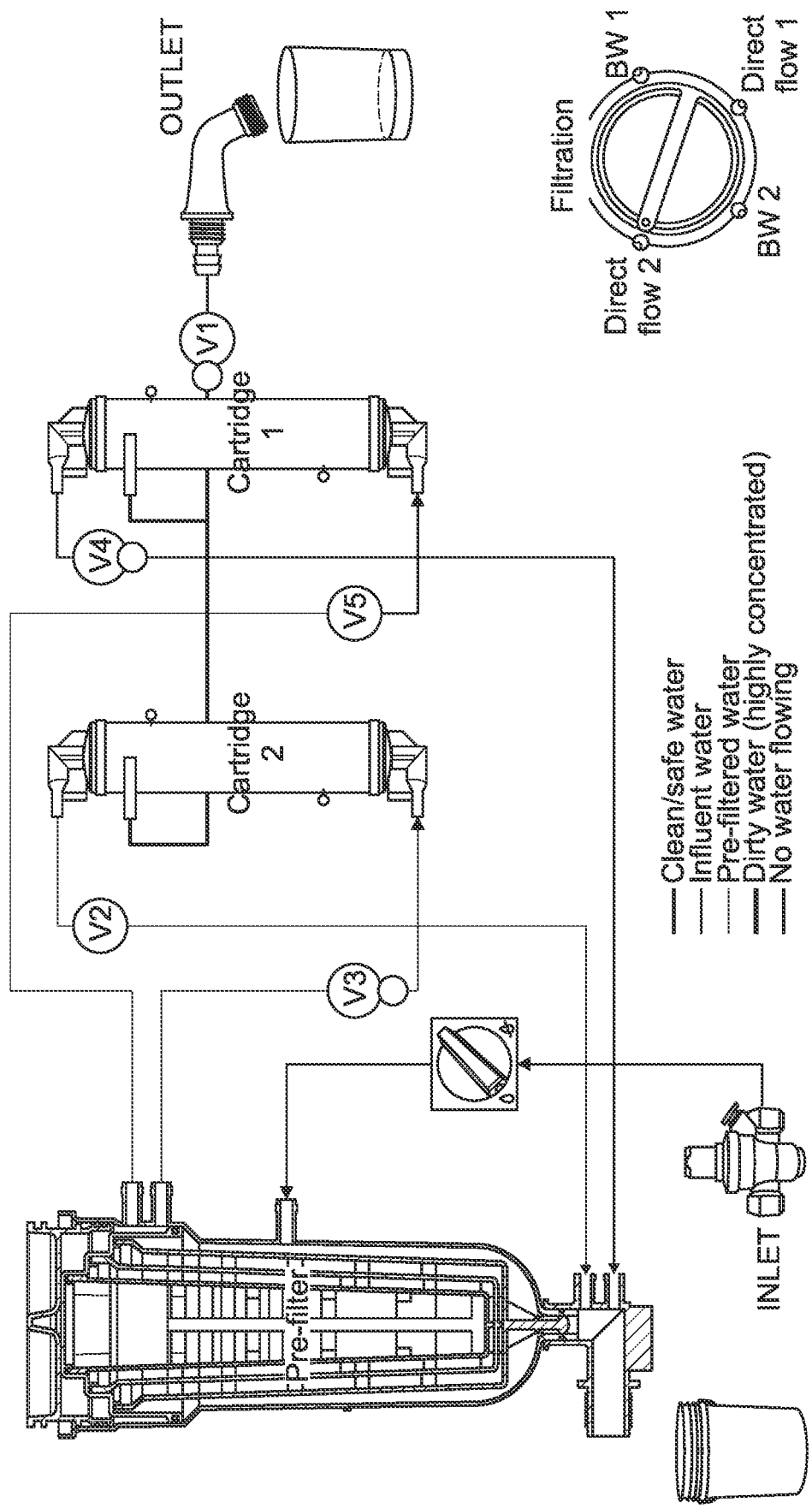
Figure 10:
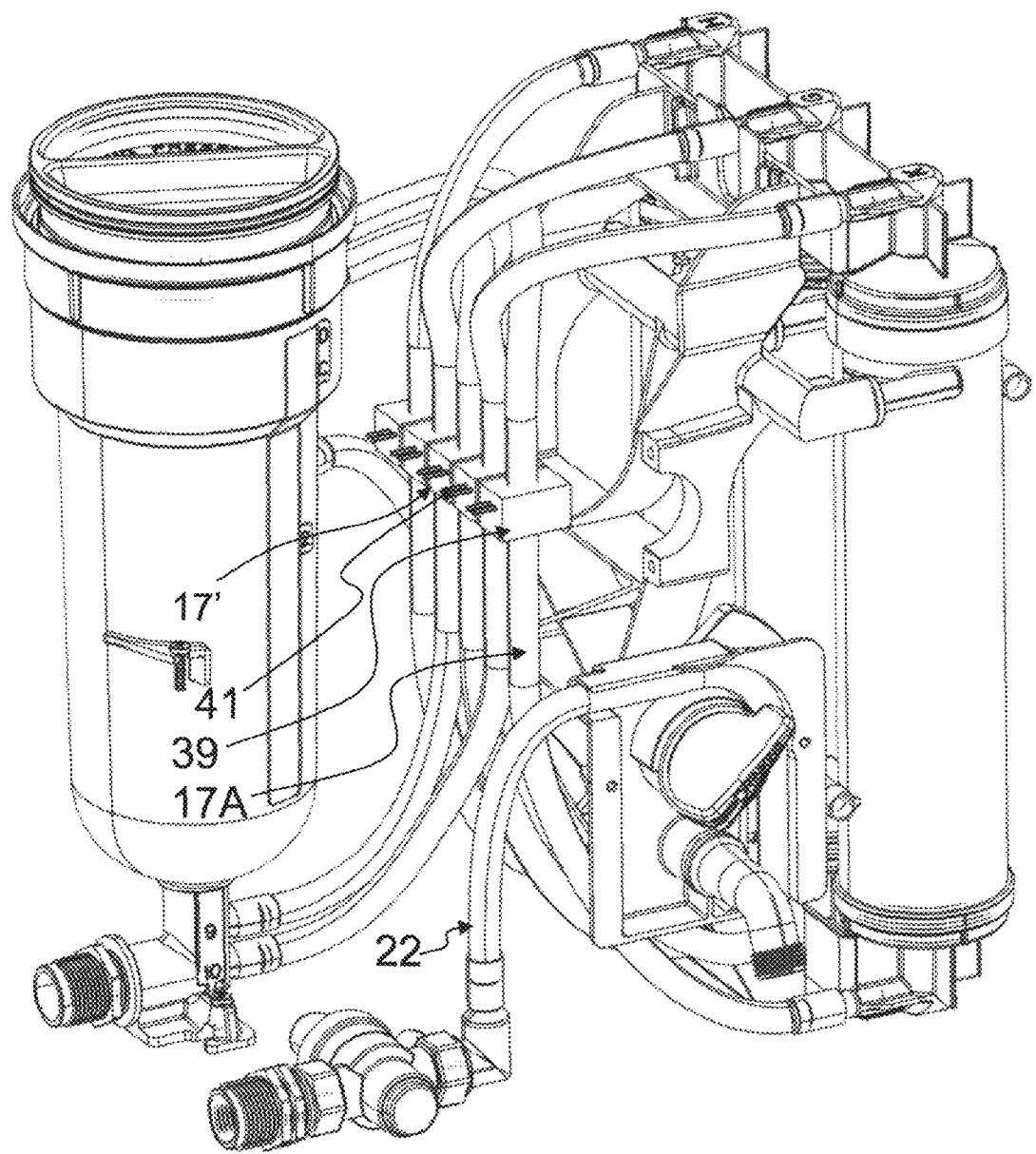
Figure 11:
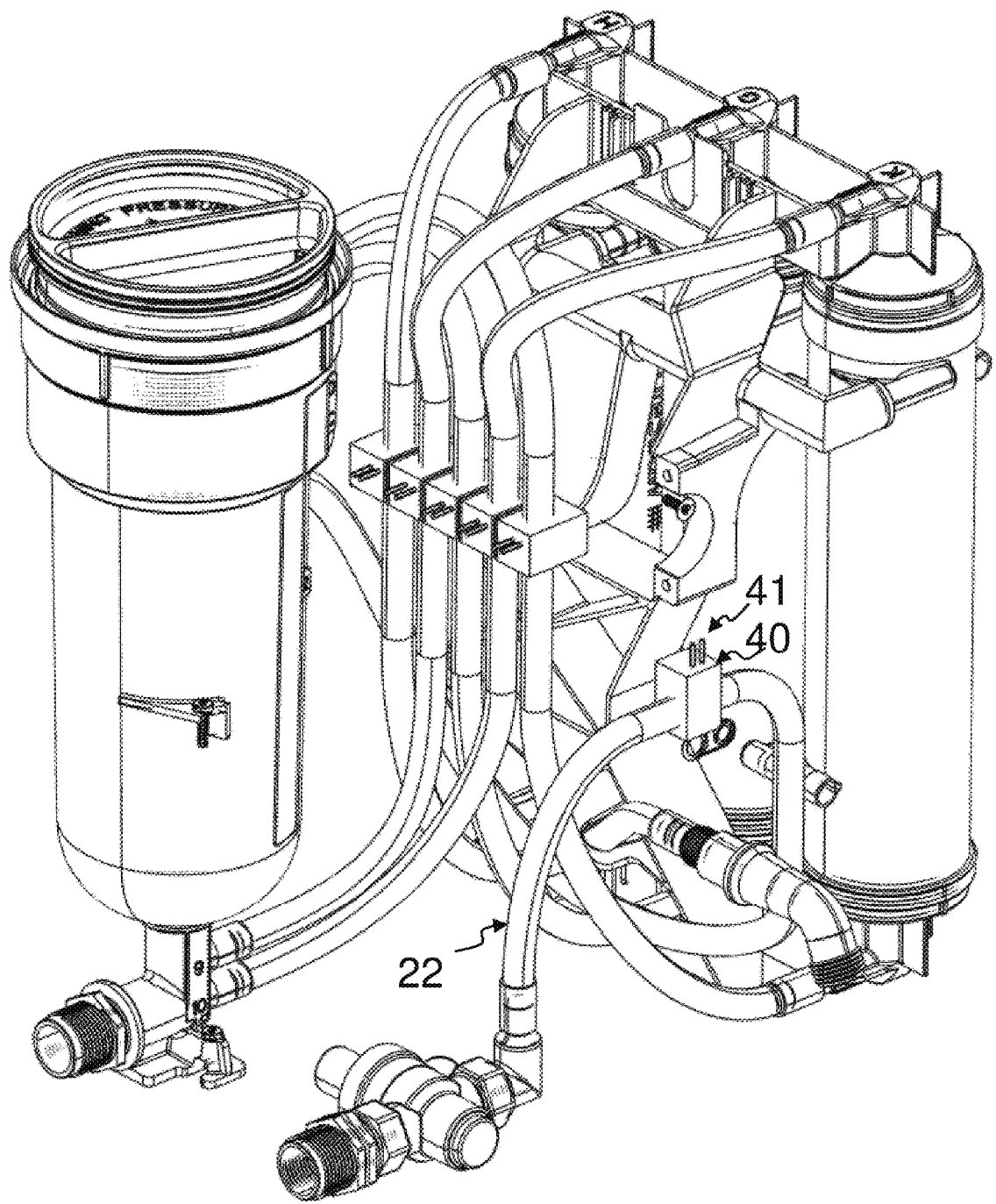

FIG. 8A illustrates a first of four steps of the cam driver;
FIG. 8B illustrates a first of four steps of the cam driver;
FIG. 8C illustrates a first of four steps of the cam driver;
FIG. 8D illustrates a first of four steps of the cam driver;
FIG. 8E shows an enlarged part of FIG. 8A;
FIG. 9A is a flow illustration through the hoses;
FIG. 9B illustrates the flow in filtration mode;
FIG. 9C illustrates the idle state;
FIG. 9D illustrates a first backwash mode for backwashing the first water filter;
FIG. 9E illustrates a first forward flush mode for flushing the first water filter;
FIG. 9F illustrates a second backwash mode for backwashing the second water filter;
FIG. 9G illustrates a second forward flush mode for flushing the second water filter;
FIG. 10 illustrates an alternative embodiment with pinch valves;

FIG. 11 illustrates a further alternative embodiment with a pinch valve on the dirt water hose.

DETAILED DESCRIPTION/PREFERRED EMBODIMENT

Figure 1:
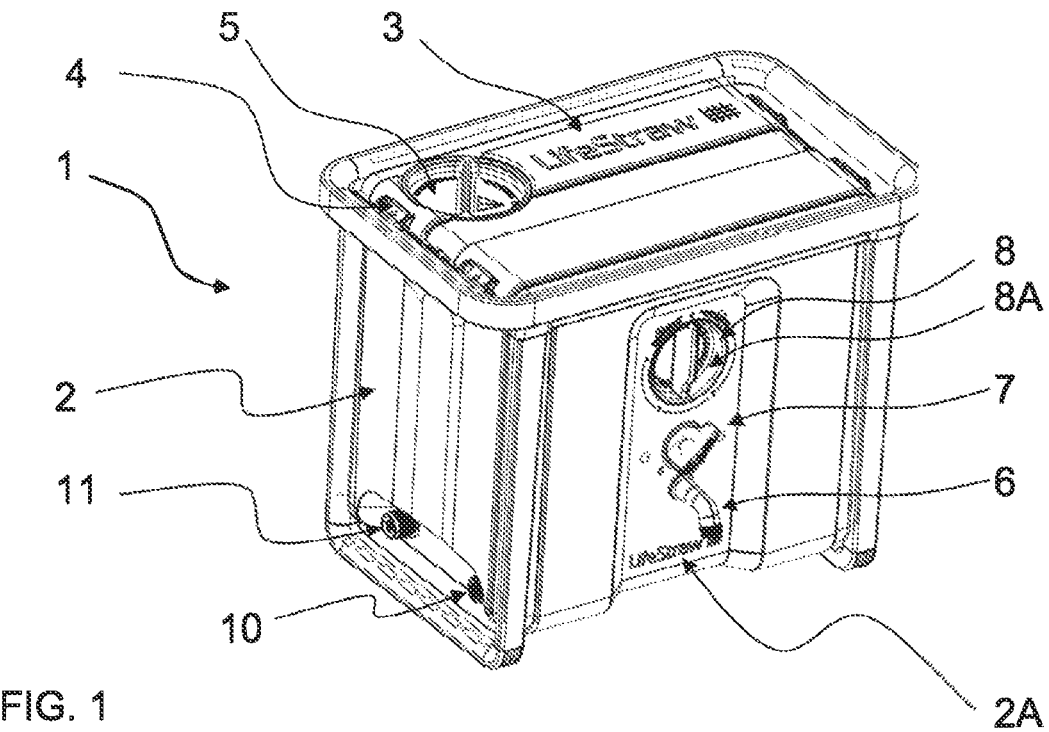

FIG. 1 illustrates a filtration device 1 that comprises a casing 2 with a demountable lid 3 that is held by a plurality of detachable clamps 4. In the current embodiment, the clamps are slidable, and a locking mechanism depends on the position of the clamp as the clamps lock the lid 3 to the lower part of the casing 2 in one position and release it in another position.

A cartridge access cap 5 is integrated in the lid 3 and can be unscrewed from the lid 3 for giving access to a pre-filter cartridge. The front panel 2A of the casing 2 comprises a tap 6, a switch 7 and a manually operated rotational handle 8A, for example for rotationally driving a cam driver 8 by rotating the handle 8A. An example thereof is explained in more detail below, where also alternatives to the cam driver 8 are discussed and where the handle 8A is explained to be applicable for controlling electrical pinch valves as alternatives to a cam driver 8.

The tap 6 is configured for dispensing filtered water when the device 1 is in filtration mode. The switch 7 is used to regulate the dispensing of water.

In the case of an embodiment with a cam driver 8, the handle 8A is used for driving a cam shaft 20 and for regulation of a backwash sequence. The functions of the switch 7 and the cam driver 8 will be explained in greater detail below.

As a further alternative, the cam 20 driven by a motor, which is not illustrated, however. Although, the device 1 is illustrated and explained in the following with a manual cam driver 8, it is understood that the driving of the cam 20 could alternatively be performed by an automated electrical motor.

Figure 2:
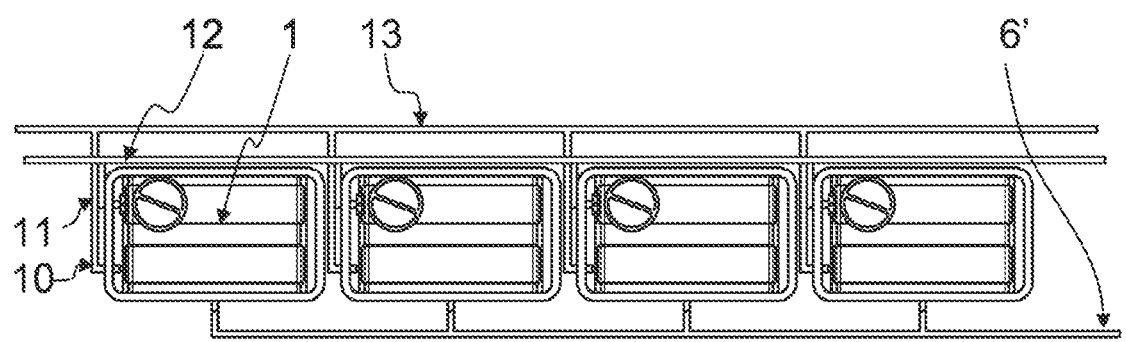
FIG. 2 shows an arrangement with serial connection between four filtration devices.

FIG. 2 shows an arrangement with parallel connection of 4 identical filtration devices 1. The taps 6 at the front panel 2A are connected for supplying filtered water through a common dispenser tube 6'. Each of the devices 1 has a dirt water inlet 10 and a backwash water outlet 11. The dirt water inlets 10 of the four devices 1 are connected to a common water supply tube 12 for supplying dirt water for filtering, for example from a supply pump (not shown). The backwash water outlets 11 are connected to a common release tube 13 for release of backwash water through the release tube 13. By connecting the filtration devices 1 in parallel with a common water supply tube 12, the capacity can be increased in a simple manner, for example in emergency situations where a large capacity of water is requested but only few water supply sources available.

Figure 3A:
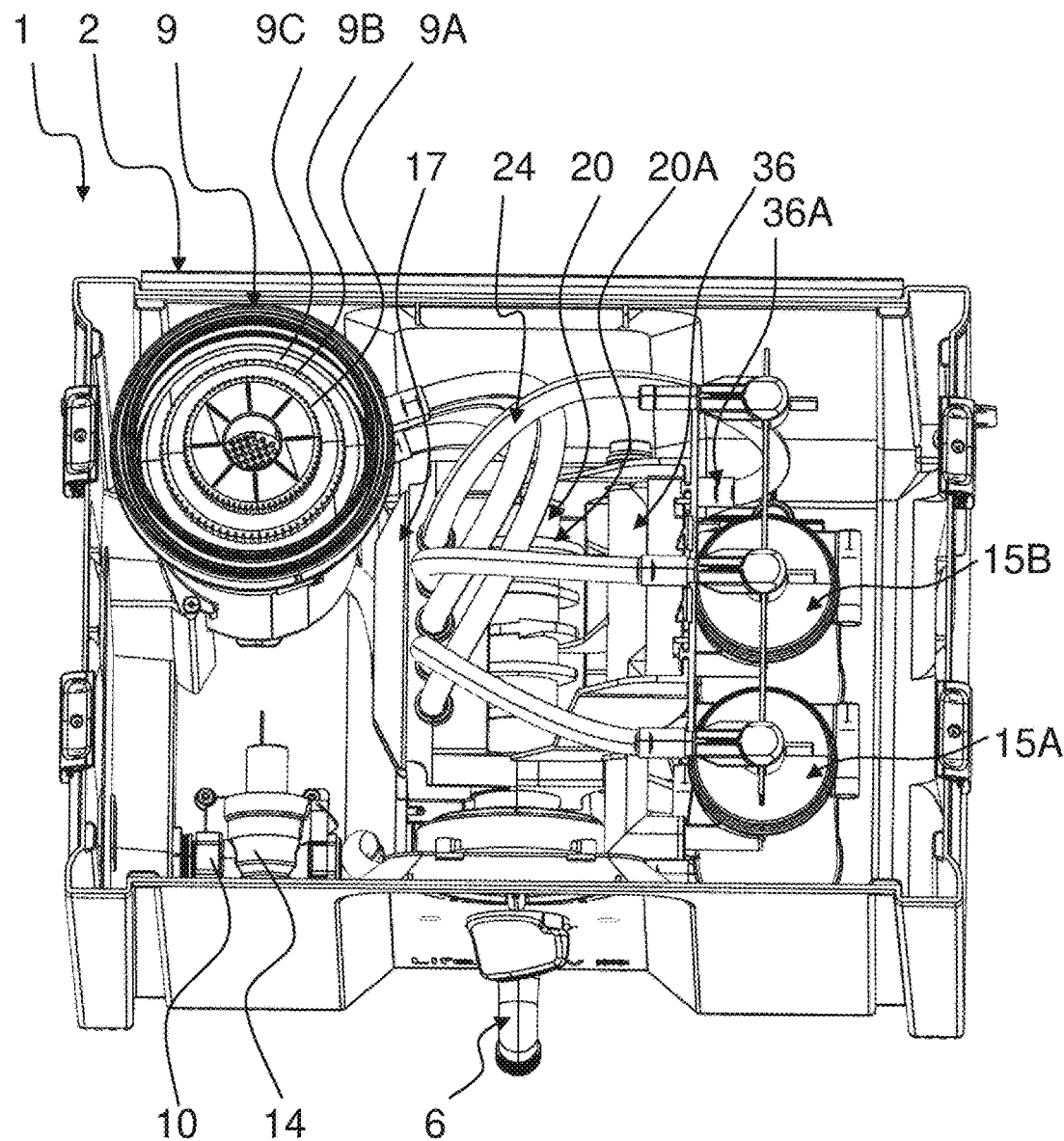
FIG. 3A shows the interior of a filtration device with two water filters.

FIG. 3A illustrates some of the components in the interior of the device 1 when the lid 3 is removed. Notice that not all of the internal components of the device 1 are shown for the sake of giving a better overview. Visible in FIG. 3A is a pre-filter housing 9 without the cartridge access cap 5 so that there is given access to a pre-filter cartridge with three pre-filter elements 9A, 9B, 9C having decreasing pore size from the inner first filter element 9A to the second filter element 9B and then to the third filter element 9C inside the pre-filter housing 9. Downstream of the dirt water inlet 10, a pressure regulator 14 regulates the water pressure to below a predetermined maximum level inside the device 1 in order to prevent further damage to the components inside the device 1. For example, the pressure is regulated to a predetermined pressure level that has a fixed value within the range of 0.2 to 2 bar above ambient pressure.

As illustrated in FIG. 3a, two microporous water filters 15A and 15B are provided for microfiltration or ultrafiltration inside the casing 2.

Figure 3B:
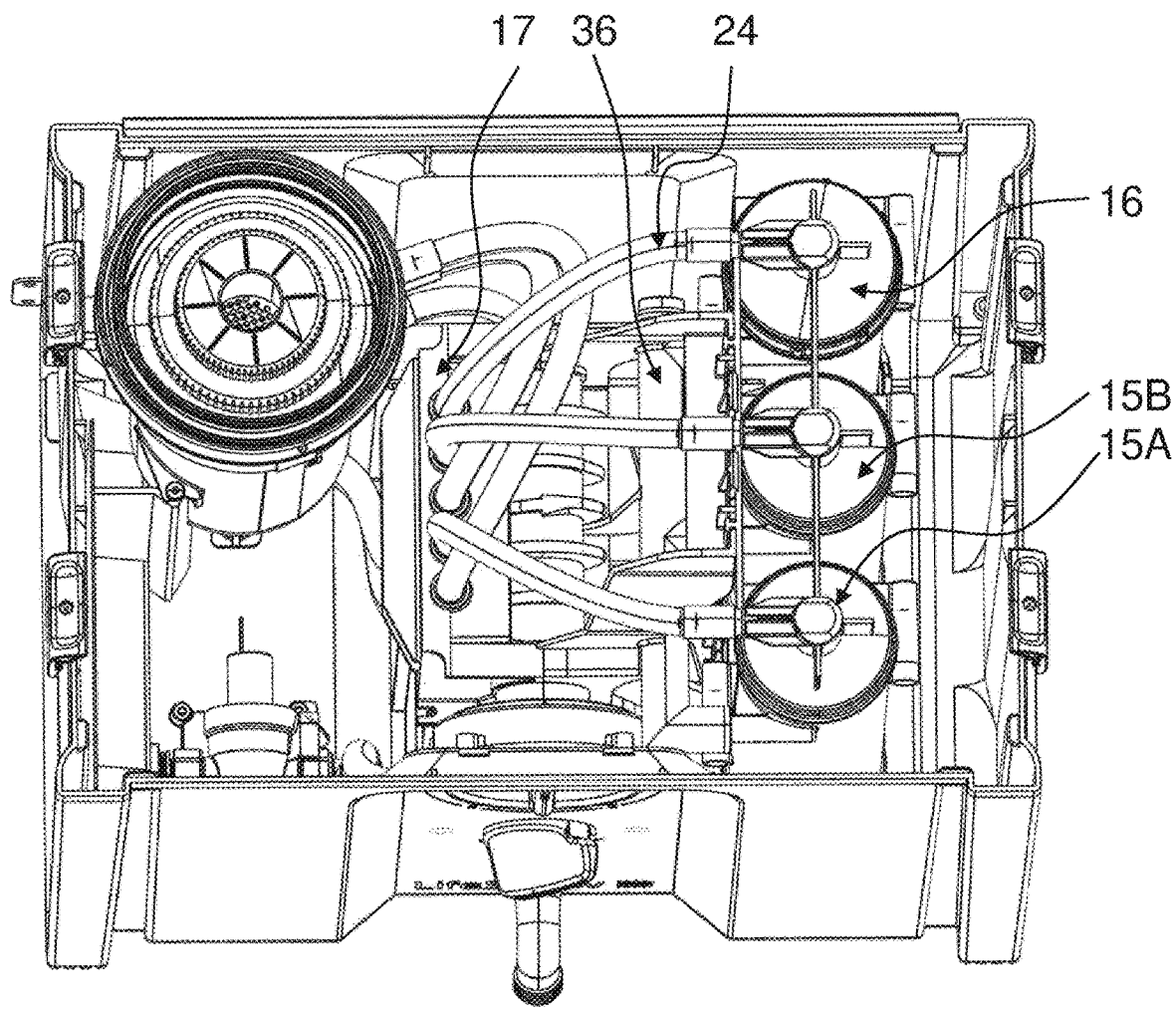
FIG. 3B shows the interior of a filtration device with two water filters and a decontamination stage.

As illustrated in FIG. 3b, optionally also a third cartridge 16 is provided, which is a decontamination stage for decontamination of chemical contaminants, configured in accordance with the type of contaminants that are to be removed, typically by absorption or adsorption, for example lead, arsenic, iodine and/or chlorine. For examples an activated-carbon filter is provided in the third cartridge 16 in order to remove chemicals, for example iodine or chlorine, prior to consumption, especially if added to the water for reducing germ content. Other options are resins that remove lead or arsenic. Whereas the water filters 15A, 15B can be used in parallel, the activated-carbon filter 16 would typically be used serially, downstream of the water filters 15A, 15B.

The filtered water from the water filters 15A and 15B enters a common connector, which is exemplified as a tubular bar 36. As illustrated in FIG. 3a, the filtered water exits the tubular bar 36 at bar connection 36A and enters a clean water hose 24 which leads the filtered water to the tap 6. In the alternative embodiment of FIG. 3b, the filtered water exits the tubular bar 36 at bar connection 36A and enters from there directly the decontamination stage 16 and gets decontaminated, after which the water exits the decontamination stage 16 at its top and enters clean water hose 24.

As seen in FIG. 3a, a cam shaft 20 with cams 20A is provided for activating valves in a multi flow arrangement 17.

Figure 5:
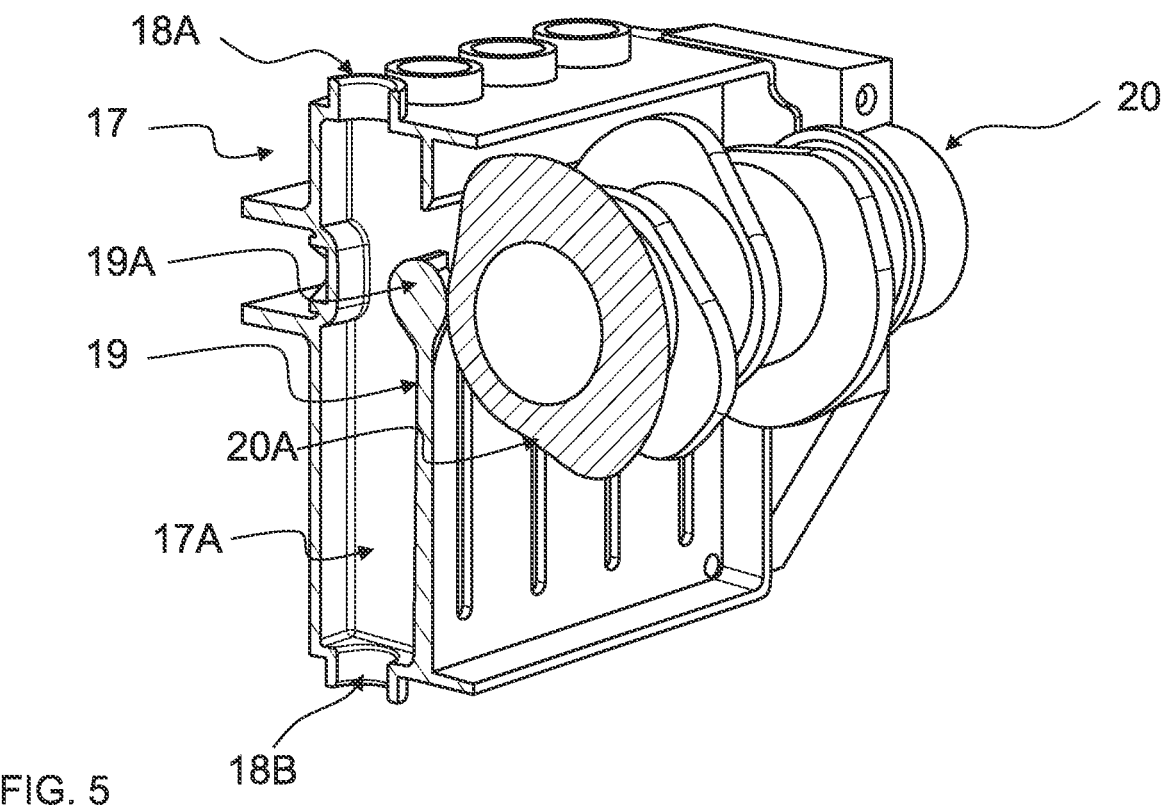
FIG. 5 illustrates a cam controller.
Figure 6:
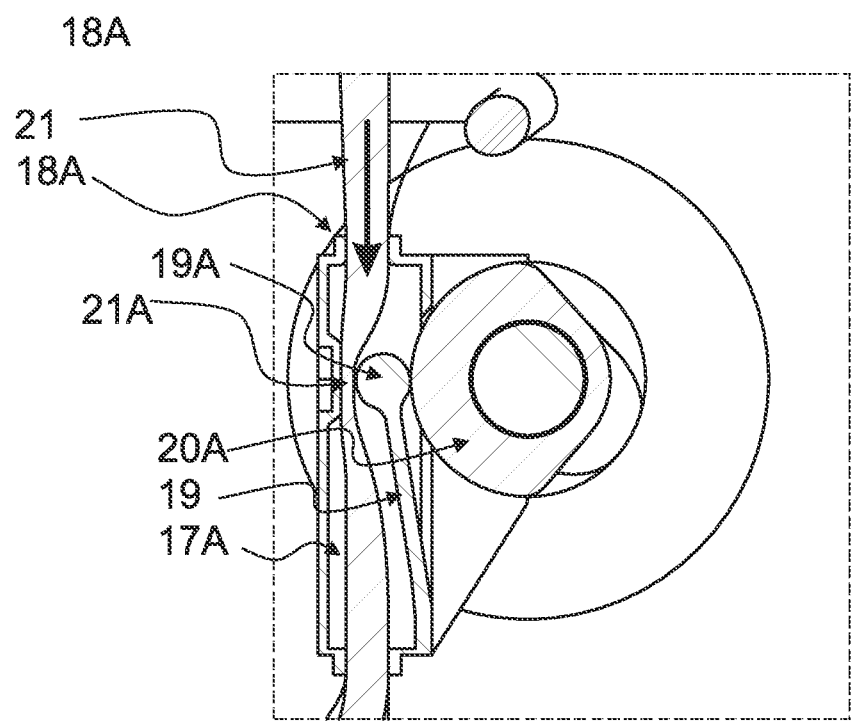
FIG. 6 is a side view of the cam controller.

FIGS. 5 and 6 illustrate the function of the cam shaft 16. A multi flow arrangement 17 comprises multiple pairs of axially aligned apertures 18A, 18B on either end of the corresponding compartment 17A of the multi flow arrangement 17, through which hoses 21 are extending, typically pushed through these apertures. For each pair of apertures 18A, 18B, there is provided a lever 19 that is operated by one of the cams 20A on the cam shaft 20 in dependence of the rotational orientation of the cam shaft 20. When the cam shaft 20 is rotated, one of the cams 20A presses the lever 19 onto the respective hose for a certain angular orientation of the cam shaft 20, so that the moving end 19A of the lever 19 squeezes part 21A of the hose 21 in the compartment 17A, as illustrated in FIG. 6. By changing the rotational orientation of the cam shaft 20, various differently arranged cams 20A press onto various corresponding levers 19 in dependence on the rotational angular position of the cam shaft 20A. By adjusting the angular orientation of the cam shaft 20, the water flows through the various hoses 21 that extend through the pairs 18A, 18B of apertures are controlled and changed.

In particular, the cam shaft 20 and the respective cams 20A are configured for stepwise change from normal filtering mode of the device 1 through a backwash sequence, and back to normal filtering mode. This will be explained in greater detail below after an explanation of the tubing inside the device 1.

Figure 4A:
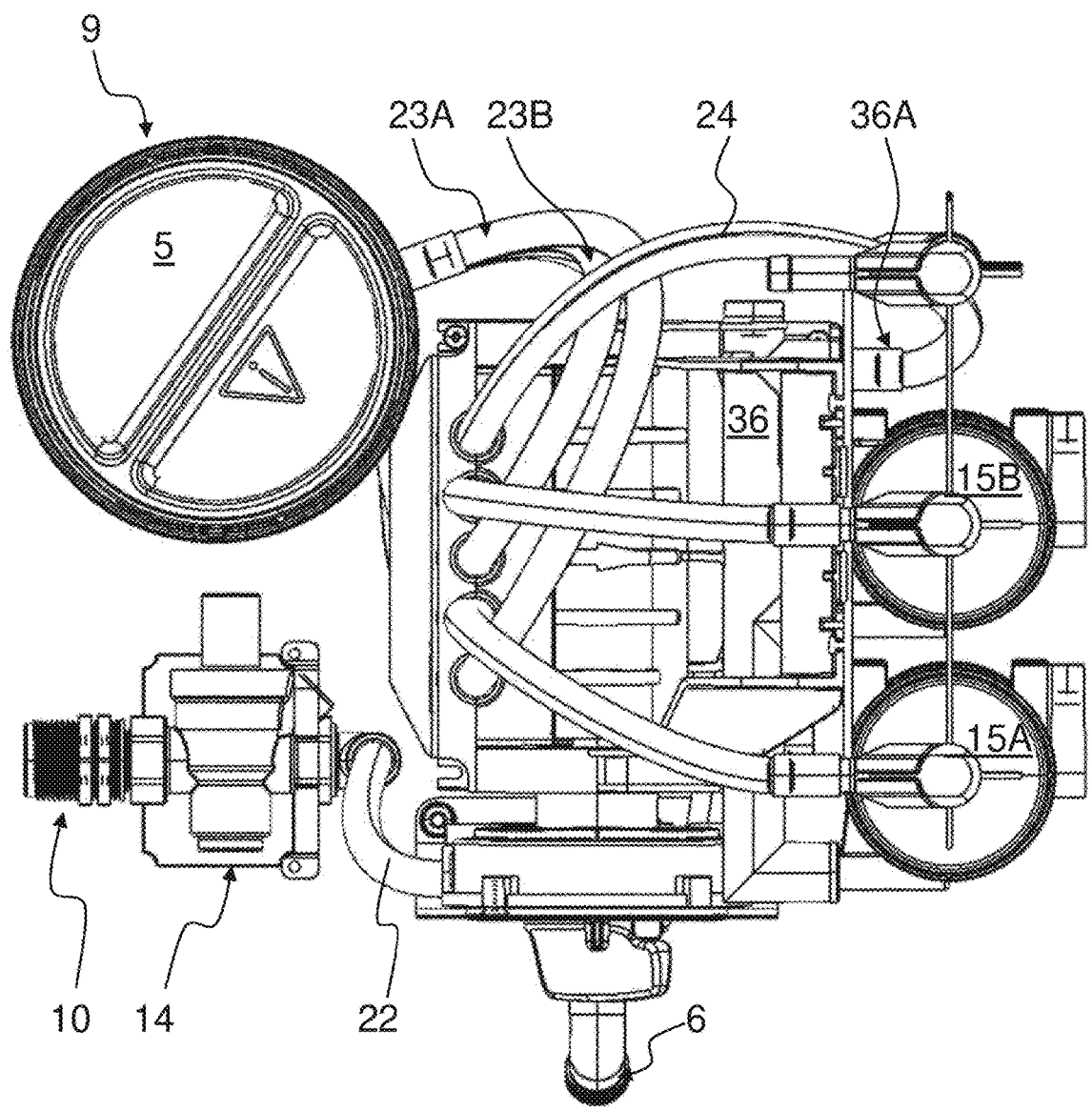
FIG. 4A illustrates some components inside the filtration device.

FIG. 4A illustrates some of the tubing inside the device casing 2. From the dirt water inlet 10, pressurized dirt water enters the pressure regulator 14, which limits the pressure to below a pre-set upper limit, for example to less than 2 bar, for example less than 1 bar or less than 0.5 bar, above ambient pressure, in order to protect the device 1 and its components against breakage because of overpressure. The dirt water downstream of the pressure regulator 14 flows into dirt water hose 22. It is pointed out that the tubing for the optional decontamination stage for examples carbon-filter 16 is not shown in FIG. 4A but in FIG. 4D.

Figure 4B:
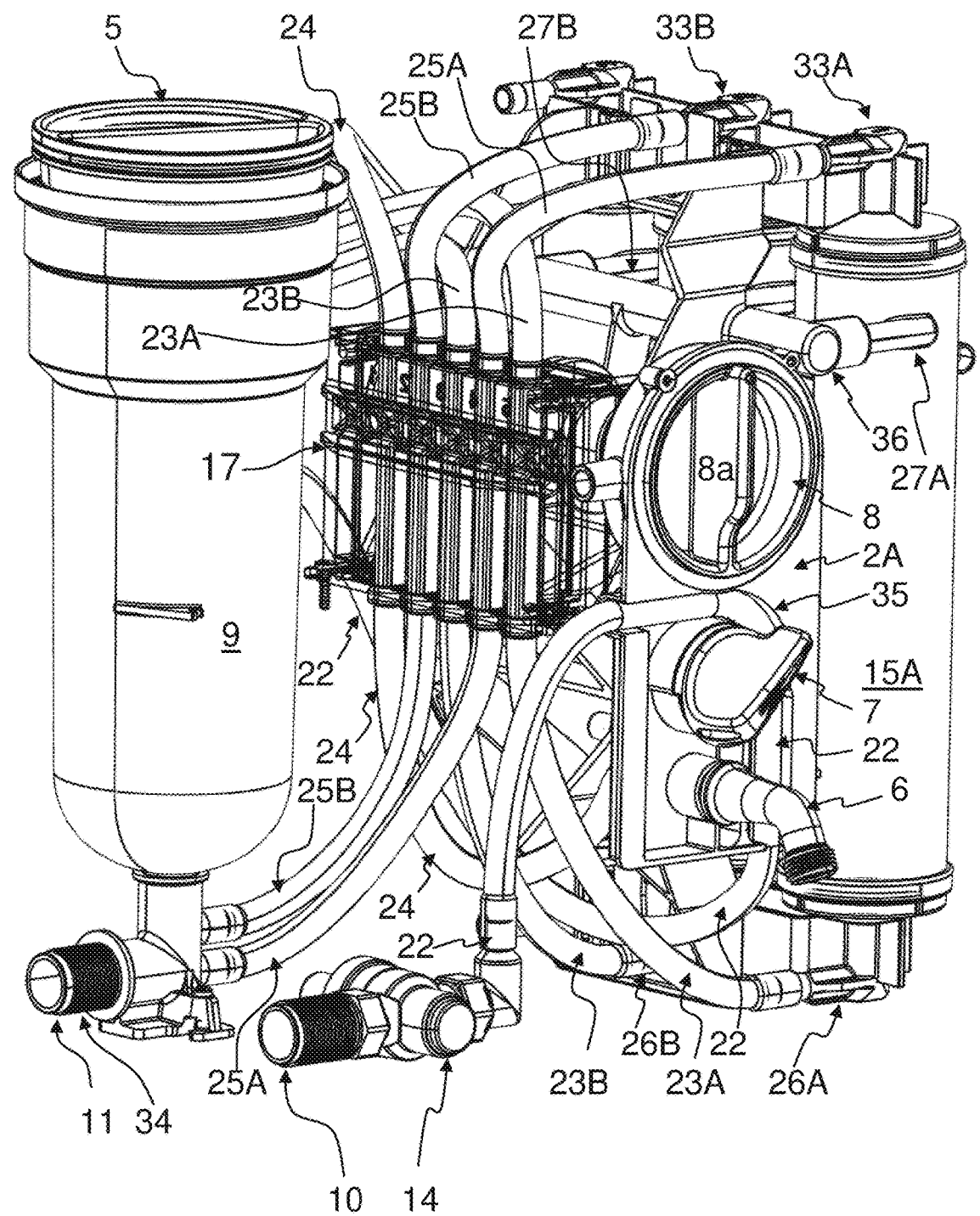
FIG. 4B Illustrates the interior with details of the tubing of the filtration device.
Figure 4C:
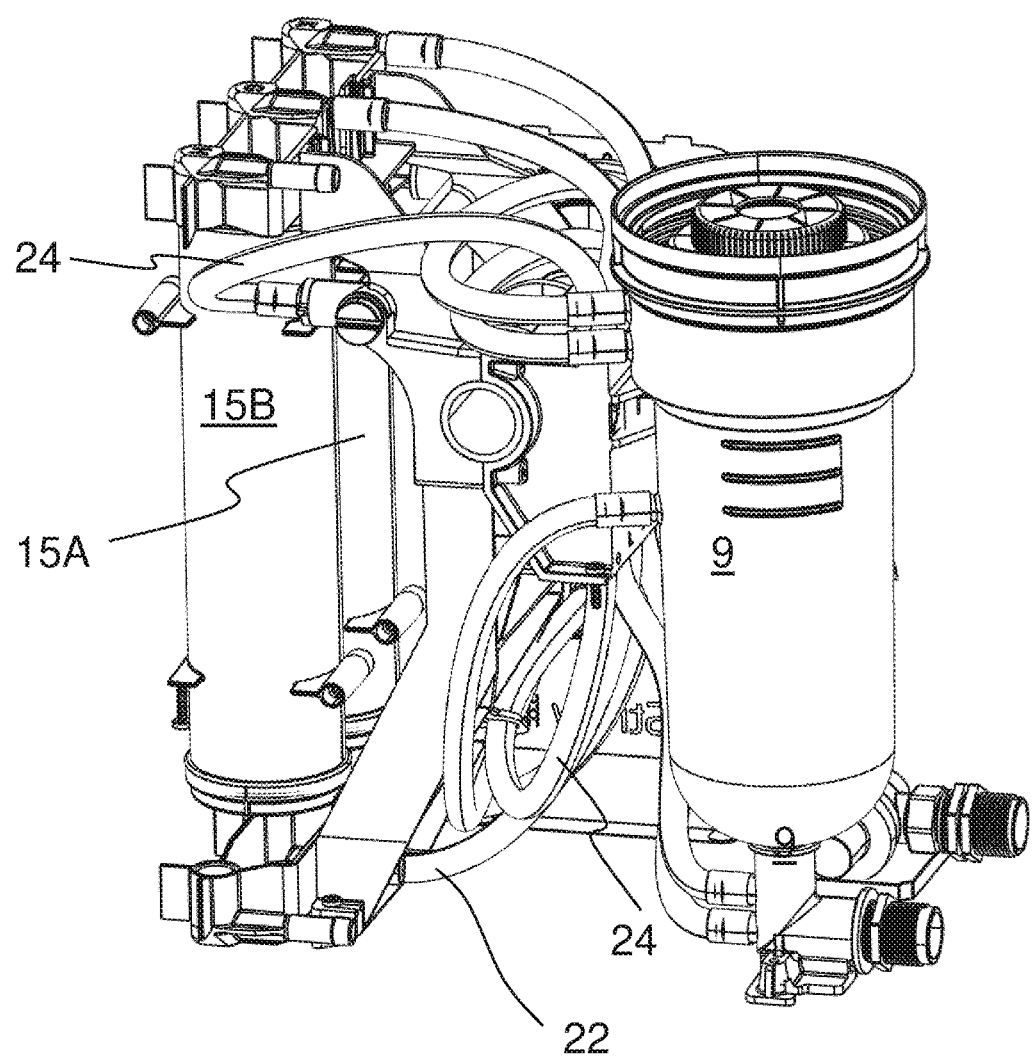
FIG. 4C illustrates a different view of the interior of the device.

FIG. 4b illustrates the configuration of the dirt water hose 22. It is positioned in and along a canal 35 around the switch 7. After the canal 35, the dirt water hose 22 bends up to the pre-filter housing 9 where the water flows through pre-filter housing 9 in for removal of particular matter by the pores in the pre-filter, for example particular matter with a grain size above 10 microns.

As best shown in FIG. 4A, the pre-filtered water leaves the pre-filter housing 9 through pre-filter outlet into a first water inflow hose 23A for water filter 15A and a second water inflow hose 23B to second water filter 15B. FIG. 4A also illustrates the inflow hoses 23A, 23B bending from the pre-filter 9 through the multi flow arrangement 17 and down to the bottom of the first and second water filter 15A, 15B.

FIG. 4B illustrates the inflow hoses 23A, 23B extending from the multi flow arrangement 17 to water filter inlets 26A, 26B. After filtration, for example microfiltration, the filtered water leaves the water filters 15A, 15B through clean water outlets 27A, 27B and into tubular cross bar 36. FIG. 4A illustrates a clean water hose 24 being connected to the connector 36A of the tubular cross bar 36 and then extending through the multi flow arrangement 17. FIG. 4B, which illustrates the hose arrangement from the opposite side, shows the clean water hose 24 extending through the multi flow arrangement 17. As further illustrated in FIG. 4B, the clean water hose 24 bends towards the back of the front panel 2A and is connected to the tap 6.

Figure 4D:
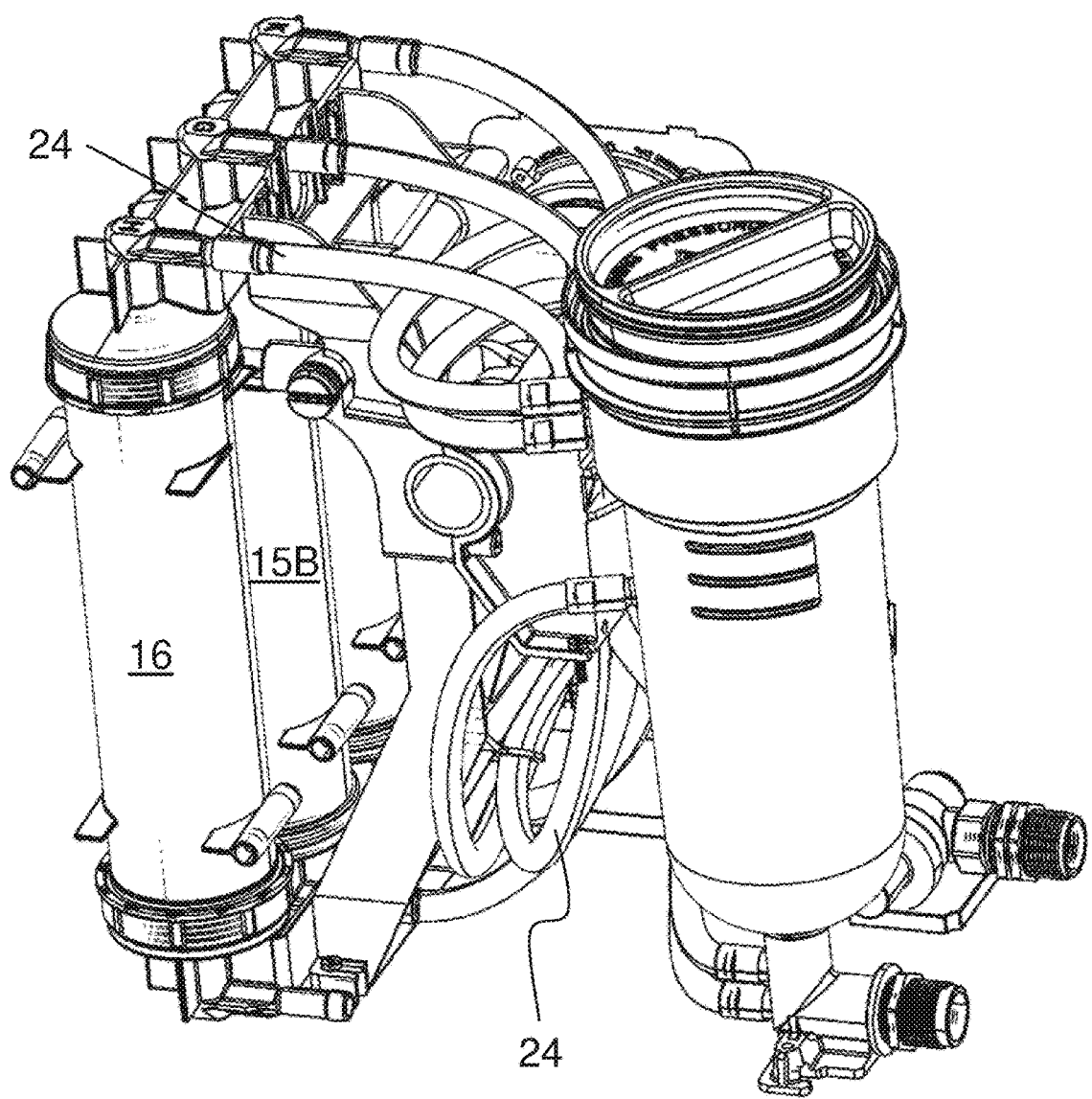
FIG. 4D illustrates the interior of the device when a decontamination stage is added.

Accordingly, the flow of water for such circuit is from the dirt water inlet 10, through pressure regulator 14, through the dirt water hose 22, through the canal 35, into the pre-filter 9, from the pre-filter 9 through inflow hoses 23A, 23B into the water filters 15A, 15B, from the water filters 15A, 15B through the tubular bar 36 and, optionally through decontamination stage 16 as shown in FIG. 4D, and through clean water hose 24 and to the tap 6, from which it can be released when the switch 7 is in the on-state orientation.

The flow through the water tap 6 is regulated by the switch 7 as shown in the semi-transparent illustration of the back side of the front panel 2A in FIG. 7A through D. In the water flow position for the tap 6, the flow though the dirt water hose 22 is not obstructed.

Figures 7A, 7B, 7C, 7D:
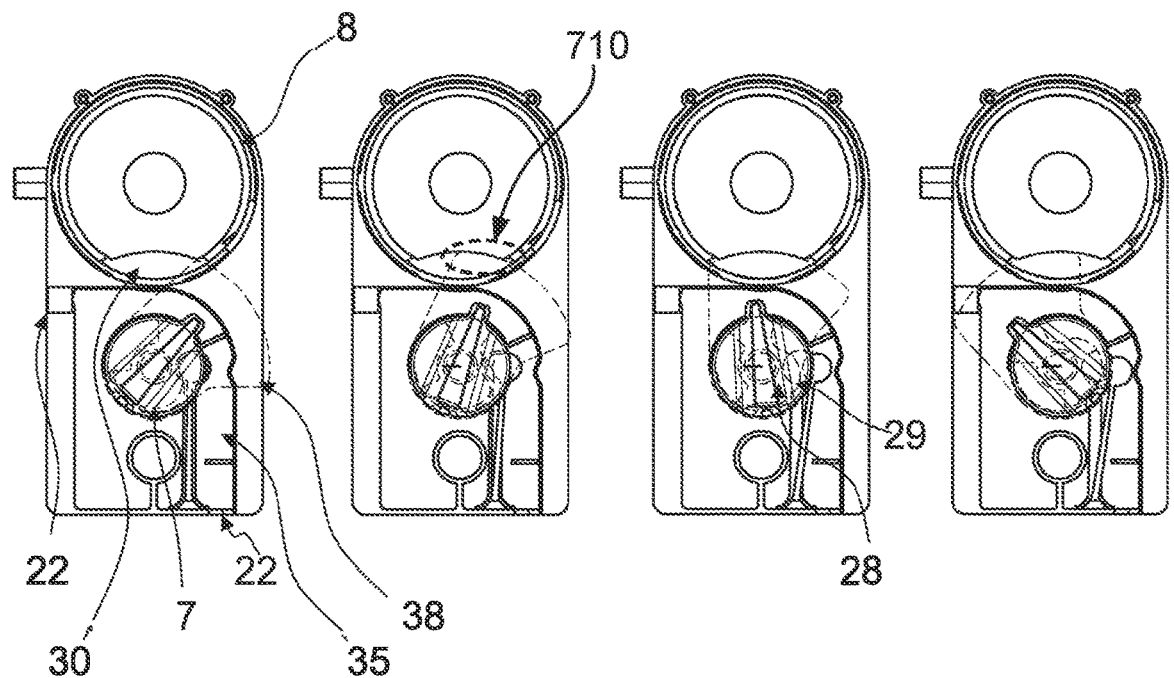
FIG. 7A illustrates the switch when in a filtration mode.
FIG. 7B illustrates the switch when not in filtration mode and blocking the upper handle from rotation.
FIG. 7C illustrates the switch when not in filtration mode and when partially squeezing the first hose by the lever.
FIG. 7D illustrates the switch when not in filtration mode and when fully squeezing the first hose by the lever.

The switch comprises a first cams 28 and a second cam 38, the different functions of which will be explained in the following. When the switch 7 is rotated, as illustrated in the sequence of FIGS. 7B, 7C, and 7D, the first cam 28 presses a lever 29 onto the dirt water hose 22 in canal 35 in order to squeeze the dirt water hose 22 to a closed position. This implies that the control for the water flow is made by squeezing the dirt water hose 22 between the pressure regulator 14 and the pre-filter 9, thus turning off the pressure on the water filters 15A, 15B ad well as the pressure on the pre-filter 9. This is a safety mechanism for preventing pressure overload on the filters 15A, 15B even in case of a malfunctioning pressure regulator 14. When the switch is turned off, and the connection between the pressure regulator 14 and the pre-filter 9 is inhibited by squeezing of the dirt water hose 22, it is also possible without inlet pressure to perform maintenance of the pre-filter 9 without having to disconnect dirt water hose 22.

This implies that the path from the tap 6 backwards to the water filters 15A and 15B is not closed by the switch 7. However, in order to prevent contamination from the water tap 6 backwards into the water filters 15A, 15B, a blocking or non-return mechanism, optionally non-return valve, for example a duckbill valve, is advantageously installed between the water filters 15A, 15B and the tap 6, for example between the clean water hose 24 and the tap 6.

When the switch 7 is rotated, as illustrated in the sequence from FIG. 7B to FIG. 7D, the second cam 38 of the switch 7 enters a recess 30 in the cam driver 8 (e.g., a portion of the second cam 38 engaging a portion of the recess within an area indicated by circle 710 in FIG. 7B), preventing the cam driver 8 from rotating. As explained in greater detail below, the cam driver 8 is only used for backwash and forward flush, and the blocking function of the rotation of the cam driver 8 when the tap 6 is closed, implies that backwash can only be performed when the water flow through tap 6 is open. In particular, for the user, this would function as follows. The user would keep the switch 7 in the open position where flow of water occurs through the tap 6. This indicates to the user that there is pressure on the system and water flow through the filters 9, 15A, 15B and out of the tap 6. When the cam driver 8 is then turned for backwash, the water flow out of the tap 6 would stop and the water flow would be reversed through the filters 15A, 15B in a sequence as described below, until the backwash cycle has been finished, after which, a renewed flow out of the tap 6 would indicate to the user, that the backwash cycle has been finished. Thus, the flow out of tap 6 prior to rotating the cam driver 8 shows the user the capability of backwash due to the water flow through the system, and the flow out of tap 6 after the backwash cycle indicates to the user that the backwash cycle has ended.

In order to ease the backwash cycle and prevent mishandling by the user, the cam driver 8 can only be turned in one direction. This is illustrated in the encircled region FIG. 8A and in enlarged illustrating in FIG. 8E, where cooperating grooves and teeth 32 form a one-way ratchet mechanism for the cam driver 8, such that the cam driver 8 after one backwash step can only be proceeded to the next step by a one-way only turning of the cam driver 8.

By turning the cam driver 8, as illustrated by the sequence of FIGS. 8A, B, C, and D, the cam shaft 20 as illustrated in FIG. 5 and as illustrated in the lower right corner of FIG. 9A is rotated and the various cams 20A in cooperation with corresponding levers 19 open and close the hoses 23A, 23B, 24, 25A, 25B in a predetermined sequence for assuring proper water flow from one component to the other according to a predetermined backwash procedure.

The cam shaft 20 with the cams 20A and the multi flow arrangement 17 in the lower right corner of FIG. 9A illustrates valves V1, V2, V3, V4, V5 provided as combinations of a cam 20A and lever 19A for a corresponding compartment 17A and which are illustrated throughout FIG. 9A to FIG. 9G. FIG. 9A is an overview of the system as described above with the various component numbers indicated. For the backwash hoses 25A and 25B and the backwash flush outlets 33A and 33B, reference is also made to FIG. 4B, where these components are indicated.

V1 opens or closes off the clean water hose 24 between the end 36A of the tubular cross bar 36 and the tap 6.

V2 opens or closes off the second backwash hose 25B between the backwash release 11 and second flush outlet 33B of the second water filter 15B.

V3 opens or closes off the second inflow hose 23B between the pre-filter 9 and the second water inlet 26B of the second water filter 15B.

V4 opens or closes off the first backwash hose 25A between the first flush outlet 33A of the first water filter 15A and the backwash release 34.

V5 opens or closes off the first inflow hose 23A between the pre-filter 9 and the first water inlet 26A of the first water filter 15A

As illustrated in FIG. 9A, the pre-filter elements 9A, 9B, 9C are shown with a bottom plug 37 plugged into the backwash release 34 for ease of removal and simultaneous emptying of the water in the pre-filter 9. The flushing of the pre-filter is performed by pulling out a pre-filter support to perform cleaning/maintenance of the element 9A, 9B, 9C.

In the FIGS. 9B through 9G, there are no numerals indicated, however, the terminology and numerals of FIG. 9A will be used.

FIG. 9B illustrates normal filtering mode and is read in combination with some of the elements illustrates in FIG. 4B and FIG. 7A. The switch 7 is in water filtration orientation and the cam driver 8 in FIG. 9B is in filtration orientation, causing V2 and V4 closed by clamping on the first and second backwash hoses 25A, 25B. The orientation of the cam driver 8 for this mode is indicated in the lower right corner of FIG. 9B. Water enters through the inlet 10 and flows through the pressure regulator 14, through the dirt water hose 22 and the canal 35, as illustrates in FIG. 4B, pass the first cam 28 and lever 29, which are not squeezing the dirt water hose 22 (see FIG. 7A for comparison), and into the pre-filter 9, which contains a pre-filter element 9A, typically with multiple layers 9B, 9C, as illustrated in FIG. 9B when read with the numeral of FIG. 9A.

From the pre-filter 9, the water flows through inflow hoses 23A, 23B, as already described above and into water inlet 26A, 26B in water filters 15A, 15B, through the filters 15A, 15B, and out of clean water outlets 27A, 27B and into clean water hose 24 and through and out of tap 6. In this mode, as illustrated in FIG. 9B, V2 and V4 are blocked in order to prevent the pre-filtered water from leaving the water filters 15A, 15B through the flush outlets 33A, 33B.

FIG. 9C illustrates the mode for the idle state of the device 1. The cam driver 8 has been left in orientation for the filtration mode. However, the switch 7 is in closed orientation and blocks for water flowing from the pressure regulator 14 to the pre-filter element 9A and further through the water filters 15A, 15B to the tap 6. In this mode, V2 and V4 are kept blocked to prevent drying out of the water filters 15A, 15B during longer storage. The function of the switch 7 on the dirt water hose 22 was explained in relation to FIG. 7D. In this idle state, it is safe to open the cartridge access cap 5 in order to access pre-filter support 9D and the interconnected pre-filter 9A, 9B and 9C to perform cleaning/maintenance of the pre-filter.

FIG. 9D illustrates the mode for the first backwash step, in which the first water filter 15A is backwashed by the filtered water from the second water filter 15B. The switch 7 is in water filtration orientation and the cam driver 8 is in orientation for the first backwash mode (BW1), which is a backwash mode for the first water filter 15A. The orientation of the cam driver 8 for this mode is indicated in the lower right corner of FIG. 9D. In this mode, V1, V2 and V5 are blocked by clamping, using the levers 19 of the multi flow arrangement 17 and cams 20A of the cam shaft 20. Water flows from the from the pre-filter 9 through the second inflow hose 23B and through the second water filter 15B for being filtered by the second water filter 15B. From the second water filter 15B, the filtered water flows out of the second water filter 15B thorough clean water outlet 27B and into the tubular cross bar 36 and further in reverse into the first clean water outlet 27A of the first water filter 15A and in backwash direction across the membrane (not shown) inside the first water filter 15A from the clean side to the dirt side. As V5 is closed, corresponding to the first inflow hose being clamped and closed, the water on the dirt side of the membrane in the first in water filter 15A can only leave through the flush outlet 33A at the top of the first water filter 15A and is then discarded through the first backwash hose 25A and the backwash release 34.

FIG. 9E illustrates the mode for the first forward flush step. The switch 7 is in water filtration orientation and the cam driver 8 is in orientation for the first forward flush (Direct flow 1) through the first water filter 15A. The orientation of the cam driver 8 for this mode is indicated in the lower right corner of FIG. 9E. In this mode, V1, V2 and V3 are closed by using the cams 20A of the cam shaft 20. The water flows from the pre-filter 9 through the first inflow hose 23A through the water inlet 26A into the first filter 15A but is prevented from traversing the membrane due to the closed valves V1, V2, and V3, which implies clamping of the clean water hose 24 so that no clean water is dispensed from the clean water hose 24. The only way out of the first water filter 15A is though the first flush outlet 33A, resulting is a forward flush, flushing out debris that has been removed from the dirt water side of the filter membrane (not shown) during the foregoing backwash step. The forward flush water from the first water filter 15A is discarded through the first backwash hose 25A and out of the device through the backwash release 34.

FIG. 9F illustrates the mode for the backwash step of the second water filter 15B. In this backwash mode, the second water filter 15B is backwashed by the filtered water from the first water filter 15A. The switch 7 is in water filtration orientation and the cam driver 8 is in orientation for the second backwash mode (BW2), which is a backwash mode for the second water filter 15B. The orientation of the cam driver 8 for this mode is indicated in the lower right corner of FIG. 9F. In this mode, V1, V3, and V4 are blocked by using the cams 20A of the cam shaft 20. Water flows from the from the pre-filter 9 through the first inflow hose 23A and into the first water filter 15A, where it is filtered, before it leaves the first water filter 15A into the tubular cross bar 36. As the water in the clean water hose 24 cannot be dispensed through the tap 6, due to closed V1, it is pressed in reverse through the second clean water outlet 27B of the second water filter 15B and in backwash direction across the membrane inside the second water filter 15B from the clean side to the dirt side. As V3 is closed, the water on the dirt side of the membrane in the second water filter 15B can only leave through the flush outlet 33B at the top of the second water filter 15B and is then discarded through the second backwash hose 25B and the backwash release 34.

FIG. 9G illustrates the mode for the forward flush step for the second water filter 15B. The switch 7 is in water filtration orientation and the cam driver 8 is in orientation for the second direct flow mode (Direct flow 2), which is a forward flush mode through the second water filter 15B. The orientation of the cam driver 8 for this mode is indicated in the lower right corner of FIG. 9G. In this mode, V1, V4 and V5 are closed by using the cams 20A of the cam shaft 20. The water flows from the pre-filter 9 through the second inflow tube 23B and through the second water outlet 26B of the second water filter 15B but is prevented from traversing the membrane due to the closed valve V1. The only way out for the water is though the second flush outlet 33B of the second water filter 15B, resulting is a forward flush, flushing out debris that has been removed from the dirt water side of the filter membrane (not shown) in the second water filter 15B. The forward flush water from the second water filter 15B is discarded through the second backwash tube 25B and the backwash release 34.

FIG. 10 illustrates an alternative embodiment, in this the combination of cam driver 8 and the clamping member in the form of a lever 19A (as depicted in FIG. 5 or FIG. 6) has been substituted by an alternative multi flow arrangement 17' in which pinch valves 39, also called squeeze valves in the technical field, presses on the flexible hoses extending though the compartments 17A in order for the closing of the hoses for flow through the hoses. Operating each of the pinch valves 39 electrically by sending electrical signals by cable to the electrical connectors 41, the corresponding pinch valve 39 closes or opens for flow through the hose that is extending through the related compartment 17A.

In order to operate the pinch valves 39, the front panel 2A, as illustrated in FIG. 1 would use a switch, for example a button, instead of the handle 8A. Alternatively, a rotatable handle could be provided, for example a similar handle 8A as for manually operating the cam driver 8. This would imply the advantage that a user would have to operate the device in largely the same way, namely by rotating the handle 8A, irrespective of the backwash sequence being done by a cam driver 8 or by pinch valves 39. In these cases, the illustrations in FIGS. 7 and 8 as well as the backwash principles illustrated in FIG. 9 apply equally well. Merely, the cam driver 8 and the multi flow arrangement 17 would be exchanged.

This implies that there would be no requirements for further instructions, once a user has learned the operation of the device 1 and the device is exchanged from a version with a cam driver to a version with electrical pinch valves, as the handle 8A and its operation remains the same.

For the sequential activation of the pinch valves 39 according to a predetermined sequence, a pinch valve controller is provided, which is electrically connected to the electrical connectors 41 of the pinch valves 39 and configured for activating the pinch valves 39 of the multi flow arrangement 17' sequentially for closing the hoses 23A, 23B, 24, 25A, 25B in accordance with a predetermined sequence for shifting between the filtration mode and the backwash mode, and optionally with the addition of the forward flush mode after backwashing.

FIG. 11 illustrated a further alternative embodiment which relatively to the embodiment in FIG. 10 is different in that the dirt water hose 22 is operated by an electrical dirt water pinch valve 40. With respect to user operation for opening or closing for flow through the dirt water hose 22, the front panel 2A, as illustrated in FIG. 1, could be provided with a switch, for example a button.

The switch for the pinch valve activation could also be of the rotatable type of switch 7 as illustrated in FIG. 1. For the user, there would be no difference in operating the rotatable switch 7 for activating a squeeze valve as illustrated in FIG. 7 with a cam 28 and lever 29 for squeezing dirt water hose 22 in canal 23, or operating the rotatable switch 7 for activating an electrical pinch valve 40. This also implies that there would be no requirements for further instructions, once a user has learned the operation of the device 1 and the device is exchanged from a version with switch 7 with a squeeze valve 28, 29 to a version with an electrical dirt water pinch valve 40, as the rotatable switch 7 and its operation remains the same.

The dirt water pinch valve 40 is illustrated in combination with the multi flow arrangement 17' with pinch valves 39 of the multi flow arrangement 17'. However it may alternative be combined with the multi flow arrangement 17 that is operated by the cam drive, as illustrated in FIGS. 4B and 5. The above arguments for similar operation and applicability of FIGS. 7, 8, and 9 apply equally well in this case, irrespective of the closing by squeezing being done by cams 20A and levers 19 or by electrical pinch valves 39.

In further alternative embodiment, the backwash cycle is performed automatically with a timer or initiated after a certain volume of filtered water. This implies some logic, for example a small computer functionally connected to an automated backwash function.

In even further alternative embodiments, the switch 7 is coupled to a card reader, a contactless reader, or a SIM card where the activation of the dirt water pinch valve 40 is dependent on a predetermined amount of water to be dispensed. For example, the volume to be dispensed depends on credit that is available for purchasing clean water, for example with one of the cards mentioned above, optionally in dependence on a code sent by SMS. It is thus possible to use the device in an automated fashion for delivery of clean water in dependence of payment.

REFERENCE NUMBERS 1 filtration device
2 casing
2A front panel of casing 2
3 demountable lid
4 slidable/lockable clamps
5 pre-filter cartridge access cap
6 tap
6' common dispenser tube
7 switch
8 cam driver
8A handle
9 pre-filter with housing
9A pre-filter element (large size filtration)
9B pre-filter element (medium size filtration)
9C pre-filter element (small size filtration)
9D pre-filter support 10 dirt water inlet
11 backwash water outlet
12 common water supply tube
13 common release tube
14 pressure regulator
15A, 15B first and second water filter
16 optional decontamination stage, for example activated-carbon filter
17 multi flow arrangement
17' alternative multi flow arrangement with pinch valves 39
17A Compartments in multi flow arrangement 17
18A, 18B pair of aligned apertures
19 clamping member in the form of a lever
19A moving end of the lever 19
20 cam shaft
20A cam on cam shaft 20
21 hose
21A squeezed part of hose 21
22 dirt water hose for transport of dirt water from the pressure regulator 14 to canal 23 around switch 7
23A, 23B first and second water inflow hoses for flow of pre-filtered water from pre-filter 9 through multi flow arrangement 17 and to first and second water filters 15A, 15B
24 clean water hose connected between tubular bar 36 and tap 6
25A, 25B first and second backwash hose
26A, 26B water inlets into water filters 15A, 15B
27A, 27B clean water outlet of filters 15A, 15B
28 first cam on switch 7
29 lever at switch 7 for squeezing dirt water hose 22 in canal 23
30 recess in cam driver for cooperating with second cam 29
31 enlarged circle of FIG. 8
32 one way ratchet mechanism
33A, 33B flush outlets of water filter 15A, 15B
34 fitting with backwash water outlet 11
35 canal for the dirt water hose 22 around the switch 7
36 tubular bar connected to clean water outlets 27A, 27B
  36A hose connector
37 bottom plug for pre-filter element 9A
38 second cam on switch 7
39 pinch valve in multi flow arrangement 17
40 dirt water pinch valve for dirt water hose 22
41 electrical connectors in pinch valves 39, 40

The invention claimed is:

1. A water filtration device comprising
a water inlet;
a clean water outlet;
a backwash water outlet;
a filtration system configured to filter to-be-filtered water from the water inlet and to provide filtered water to the clean water outlet, the filtration system comprising a first water filter;
a tubing system having multiple hoses that comprise:
an inlet water hose in an inlet flow path between the water inlet and the filtration system;
a clean water hose in a clean flow path between at least the first water filter of the filtration system and the clean water outlet; and
a first backwash hose in a first backwash flow path from the first water filter of the filtration system to the backwash water outlet; and
a multi-flow arrangement comprises multiple compartments through which the multiple hoses of the tubing system respectively extend, wherein each one of the compartments comprises a clamping member configured to clamp a corresponding one of the multiple hoses extending through the corresponding compartment when the clamping member is activated and to not clamp the corresponding one of the multiple hoses when the clamping member is not activated,
wherein the multi-flow arrangement is configured to set the water filtration device in different operation modes according to an order in a predetermined sequence of the operation modes, based on selectively setting each of the clamping members of the compartments to be activated or not activated.

2. The water filtration device according to claim 1, further comprising a panel,
wherein the panel is functionally connected to the clamping members and configured to control the clamping members in the multi-flow arrangement by a user operation of the panel.

3. The water filtration device according to claim 1, wherein
the filtration system further comprises a second water filter,
the operation modes include, based on the order in the predetermined sequence of the operation modes, a filtration mode, a first backwash mode, and a second backwash mode,
based on the water filtration device being set in the filtration mode, the water filtration device is configured to define a first filtration flow and a second filtration flow, the first filtration flow being from a first filter inlet of the first water filter through the filter water filter to a first filter outlet of the first water filter, and then to the clean water outlet, and the second filtration flow being from a second filter inlet of the second water filter through the second water filter to a second filter outlet of the second water filter, and then to the clean water outlet, based on the water filtration device being set in the first backwash mode, the water filtration device is configured to define a first backwash flow from the second filter inlet of the second water filter through the second water filter to the second filter outlet of the second water filter, then to the first filter outlet of the first water filter through the first water filter to a first backwash flush outlet of the first water filter for backwashing the first water, and then to the backwash water outlet, and based on the water filtration device being set in the second backwash mode, the water filtration device is configured to define a second backwash flow from the first filter inlet of the first water filter through the first water filter to the first filter outlet of the first water filter, then to the second filter outlet of the second water filter through the second water filter to a second backwash flush outlet of the second water filter for backwashing the second water filter, and then to the backwash water outlet.

4. The water filtration device according to claim 3, wherein the operation modes further include:
after the first backwash mode based on the order in the predetermined sequence of operation modes, a first forward flush mode with forward flush of the first water filter, and
after the second backwash mode based on the order in the predetermined sequence of operation modes, a second forward flush mode with forward flush of the second water filter.

5. The water filtration device according to claim 1, further comprising a pressure regulator in the inlet flow path between the water inlet and the filtration system and configured to limit a pressure toward the filtration system in the inlet flow path to below a predetermined value for preventing damage to the filtration system due to overpressure, wherein the predetermined value is in a range of 0.2 to 2 bar above an ambient atmospheric pressure.

6. The water filtration device according to claim 5, further comprising a panel, wherein
the panel comprises a switch switchable between an on-state and an off-state,
based on the switch in the off-state, the switch is configured to cause blockage of a flow at a position in the inlet flow path between the pressure regulator and the filtration system, and
based on the switch in the on-state, the switch is configured to not cause the blockage of the flow in the inlet flow path.

7. The water filtration device according to claim 6, wherein
the panel comprises a lever, and
the switch comprises a cam that is configured to cause the blockage by pressing the lever to squeeze the inlet water hose when the switch is the off-state.

8. The water filtration device according to claim 1, further comprising a casing,
wherein the water filtration device is a portable device with a weight in a range of 5 to 20 kg, and
wherein the water inlet, the backwash water outlet, the filtration system, the multiple hoses, and the multi-flow arrangement are provided in the casing.

9. The water filtration device according to claim 1, wherein the clamping member for each compartment of the multi-flow arrangement comprises an electrical pinch valve that is configured to clamp a corresponding hose extending through the corresponding compartment based on at least one of:
a user operation of a panel of the water filtration device,
automatic activation of the clamping member determined by a timer after a predetermined time lapse, and
automatic activation of the clamping member after the water filtration device dispensing of a predetermined volume of filtered water.

10. The water filtration device according to claim 9, further comprising a pinch valve controller configured to receive a user command from the panel and, upon the user command indicating activation of one of the clamping members, control a corresponding pinch valve of the one of the clamping members to clamp the corresponding hose.

11. The water filtration device according to claim 1, further comprising a cam shaft that is rotatable with respect to a rotation axis and with multiple cams provided in parallel planes perpendicular to the rotation axis on the cam shaft for rotation therewith, each of the multiple cams being arranged for activating the clamping member in a corresponding one of the compartments to clamp the corresponding hose when attaining a predetermined individual angular clamping position during rotation of the cam shaft,
wherein the cams are provided at different angular locations of the cam shaft for selectively clamping the multiple hoses in the compartments based on a rotation of the cam shaft in accordance with the predetermined sequence of the operation modes.

12. The water filtration device according to claim 11,
wherein the filtration system further comprises a second water filter, and
wherein the water filtration device is configured to perform a backwash flush sequence of operations by turning the cam shaft:
from a first orientation corresponding to setting the water filtration device in a filtration mode,
to a second orientation corresponding to setting the water filtration device in a first backwash mode for backwash of the first water filter with filtered water from the second water filter,
and to a further orientation corresponding to setting the water filtration device in a second backwash mode for backwash of the second water filter with filtered water from the first water filter.

13. The water filtration device according to claim 11,
wherein the filtration system further comprises a second water filter, and
wherein the water filtration device is configured to perform a backwash and forward flush sequence of operations by turning the cam shaft:
from a first orientation corresponding to setting the water filtration device in a filtration mode,
to a second orientation corresponding to setting the water filtration device in a first backwash mode for backwash of the first water filter with filtered water from the second water filter,
further to a third orientation corresponding to setting the water filtration device in a first forward flush mode for forward flush of the first water filter,
further to a fourth orientation corresponding to setting the water filtration device in a second backwash mode for backwash of the second water filter with filtered water from the first water filter, and further to a fifth orientation corresponding to setting the water filtration device in a second forward flush mode for forward flush of the second water filter.

14. The water filtration device according to claim 1, further comprising a panel,
wherein the panel comprises a manually rotatable handle that is functionally connected to the clamping members for operating the clamping members in the multi-flow arrangement by manual rotation of the handle, the manual rotation of the handle in a single direction shifting the water filtration device among the operation modes by causing the clamping members to selectively clamp or not clamp the corresponding hoses.

15. The water filtration device according to claim 14, wherein
the panel comprises a switch switchable between an on-state and an off-state,
based on the switch in the off-state, the switch is configured to cause blockage of a flow at a position in the inlet flow path,
based on the switch in the on-state, the switch is configured to not cause the blockage of the flow in the inlet flow path, and
the switch comprises a blocking member configured to block rotation of the handle when the switch is in the off-state.

16. The water filtration device according to claim 1, wherein the first water filter comprises:
a first filter inlet at an upstream side of the first water filter for receiving water for filtration by the first water filter, and
a first filter outlet at a downstream side of the first water filter for delivering water filtered by the first water filter,
wherein the first water filter has a water flow direction during filtration from the upstream side of the first water filter to the downstream side of the first water filter and a water flow direction during backwash from the downstream side of the first water filter to the upstream side of the first water filter;
wherein the tubing system further comprises:
a first inflow hose connected to the first water filter and provided as part of a water flow path from the water inlet to the first filter inlet for flow of water through the first inflow hose to the first filter inlet;
the clean water hose configured to receive filtered water from the first filter outlet of the first water filter; and
the first backwash hose connected between the backwash water outlet and the upstream side of the first water filter for flow of backwash water from the first water filter to the backwash water outlet during backwash of the first water filter;
wherein the operation modes include a filtration mode and a first backwash mode,
wherein, based on the water filtration device being set in the filtration mode, the multi-flow arrangement is set to clamp the first backwash hose in the multi-flow arrangement and not clamp the first inflow hose and the clean water hose;
wherein, based on the water filtration device being set in the first backwash mode, the multi-flow arrangement is set to clamp the first inflow hose in the multi-flow arrangement and not clamp the clean water hose and the first backwash hose.

17. The water filtration device according to claim 16, wherein the first water filter further comprises a first flush outlet at the upstream side of the first water filter for release of water during forward flush with a water flow into the first filter inlet through the first water filter and out of the first flush outlet for forward flushing along the upstream side inside the first water filter;
wherein the first backwash hose is connected to the first flush outlet;
wherein the operation modes further include a first forward flush mode;
wherein, based on the water filtration device being set in the first forward flush mode, the water filtration device is configured to clamp the clean water hose in the multi-flow arrangement by setting the multi-flow arrangement to clamp the clean water hose and not clamp the first inflow hose and the first backwash hose.

18. The water filtration device according to claim 16, wherein the filtration system further comprises a second water filter, the second water filter comprising:
a second filter inlet at an upstream side of the second water filter for receiving water for filtration by the second water filter, and
a second filter outlet at a downstream side of the second water filter for delivering water filtered by the second water filter,
wherein the second water filter has a water flow direction during filtration from the upstream side of the second water filter to the downstream side of the second water filter and a water flow direction during backwash from the downstream side of the second water filter to the upstream side of the second water filter;
wherein the clean water hose is also configured to receive filtered water from the second filter outlet of the second water filter;
wherein, based on the water filtration device being set in the first backwash mode, the water filtration device is configured to define a first backwash flow from the second filter inlet of the second water filter through the second water filter to the second filter outlet of the second water filter, then to the clean water hose and from the clean water hose to the first filter outlet of the first water filter through the first water filter for backwashing the first water filter, and then to the backwash water outlet.

19. The water filtration device according to claim 18, wherein the tubing system further comprises:
a second inflow hose connected to the second water filter and provided as part of a flow path from the water inlet to the second filter inlet for flow of water from the water inlet through the second inflow hose to the second filter inlet; and
a second backwash hose connected between the backwash water outlet and the upstream side of the second water filter for flow of backwash water from the second water filter to the backwash water outlet during backwash of the second water filter;
wherein the second inflow hose and the second backwash hose extend through corresponding compartments in the multi-flow arrangement;
wherein, based on the water filtration device being set in the filtration mode, the multi-flow arrangement is set to clamp the second backwash hose in the multi-flow arrangement and not to clamp the second inflow hose and the clean water hose;
wherein, based on the water filtration device being set in the first backwash mode, the multi-flow arrangement is set to clamp the second backwash hose in the multi-flow arrangement.

20. A method for operating a water filtration device, the water filtration device comprising:
- a water inlet;
- a clean water outlet;
- a backwash water outlet;
- a filtration system configured to filter to-be-filtered water from the water inlet to provide clean water to the clean water outlet, the filtration system comprising a first water filter;
- a tubing system having multiple hoses that comprise:
  - an inlet water hose in an inlet flow path between the water inlet and the filtration system;
  - a clean water hose in a clean flow path between at least the first water filter of the filtration system and the clean water outlet; and
  - a first backwash hose in a first backwash flow path from the first water filter of the filtration system to the backwash water outlet;
- a multi-flow arrangement comprises multiple compartments through which the multiple hoses of the tubing system respectively extend, wherein each one of the compartments comprises a clamping member configured to clamp one of the multiple hoses extending through the corresponding compartment when the clamping member is activated and to not clamp the corresponding one of the multiple hoses when the clamping member is not activated;

wherein the method comprises:
setting the water filtration device in different operation modes according to an order in a predetermined sequence of the operation modes, based on selectively setting each of the clamping members of the compartments to be activated or not activated, comprising:
- based on the water filtration device being set in a filtration mode of the operation modes, configuring the multi-flow arrangement to define a first filtration flow from a first filter inlet of the first water filter through the filter water filter to a first filter outlet of the first water filter, and then to the clean water outlet,
- based on the water filtration device being set in a first backwash mode of the operation modes, configuring the multi-flow arrangement to define a first backwash flow at least the first filter outlet of the first water filter through the first water filter to a first backwash flush outlet of the first water filter for backwashing the first water, and then to the backwash water outlet.

* * * * *